US008390684B2

(12) United States Patent
Piran et al.

(10) Patent No.: US 8,390,684 B2
(45) Date of Patent: Mar. 5, 2013

(54) METHOD AND SYSTEM FOR VIDEO COLLECTION AND ANALYSIS THEREOF

(75) Inventors: Gadi Piran, Suffern, NY (US); Shmuel Diamant, Bronx, NY (US); Morten Nielsen, New York City, NY (US)

(73) Assignee: On-Net Surveillance Systems, Inc., Pearl River, NY (US)

( * ) Notice: Subject to any disclaimer, the term of this patent is extended or adjusted under 35 U.S.C. 154(b) by 1010 days.

(21) Appl. No.: 12/414,035

(22) Filed: Mar. 30, 2009

(65) Prior Publication Data

US 2009/0288011 A1 Nov. 19, 2009

Related U.S. Application Data

(60) Provisional application No. 61/040,468, filed on Mar. 28, 2008.

(51) Int. Cl.
*H04N 9/47* (2006.01)
*H04N 7/18* (2006.01)
(52) U.S. Cl. .................. 348/143; 348/153; 348/159
(58) Field of Classification Search .................. 348/135, 348/141, 143, 153, 159
See application file for complete search history.

(56) References Cited

U.S. PATENT DOCUMENTS

| 7,015,945 | B1 | 3/2006 | Sullivan |
| 7,280,673 | B2 | 10/2007 | Buehler et al. |
| 7,884,849 | B2 * | 2/2011 | Yin et al. ........................ 348/143 |
| 2002/0060680 | A1 * | 5/2002 | Soohoo ........................... 345/428 |
| 2003/0185296 | A1 | 10/2003 | Masten, Jr. |
| 2003/0202575 | A1 * | 10/2003 | Williams et al. ........... 375/240.01 |
| 2006/0101341 | A1 | 5/2006 | Kelly et al. |
| 2006/0171453 | A1 | 8/2006 | Rohlfing et al. |
| 2006/0176951 | A1 * | 8/2006 | Berman et al. ........... 375/240.01 |
| 2006/0221184 | A1 * | 10/2006 | Vallone et al. ................. 348/155 |
| 2006/0290780 | A1 | 12/2006 | Porikli |
| 2008/0002894 | A1 * | 1/2008 | Hayon et al. .................. 382/232 |

OTHER PUBLICATIONS

International Search Report dated Jan. 4, 2010, for corresponding PCT Application No. PCT/US2009/038760.

* cited by examiner

*Primary Examiner* — Brian J Gillis
(74) *Attorney, Agent, or Firm* — Stroock & Stroock & Lavan LLP

(57) ABSTRACT

A computer implemented method of performing video surveillance on a computer system, wherein the computer system comprises a video and a display with a graphical user interface, the graphical user interface including a source window to view play back of the video, the surveillance method comprising: determining an area of interest of a frame of the video based upon a selection of the area of interest within the source window, and generating a plurality of windows within the graphical user interface, each of the windows displaying the area of interest of the frame of the video at a point in time, wherein the graphical user interface includes controls to manipulate the playback of the video from a point in time relative to each displayed portion.

5 Claims, 15 Drawing Sheets

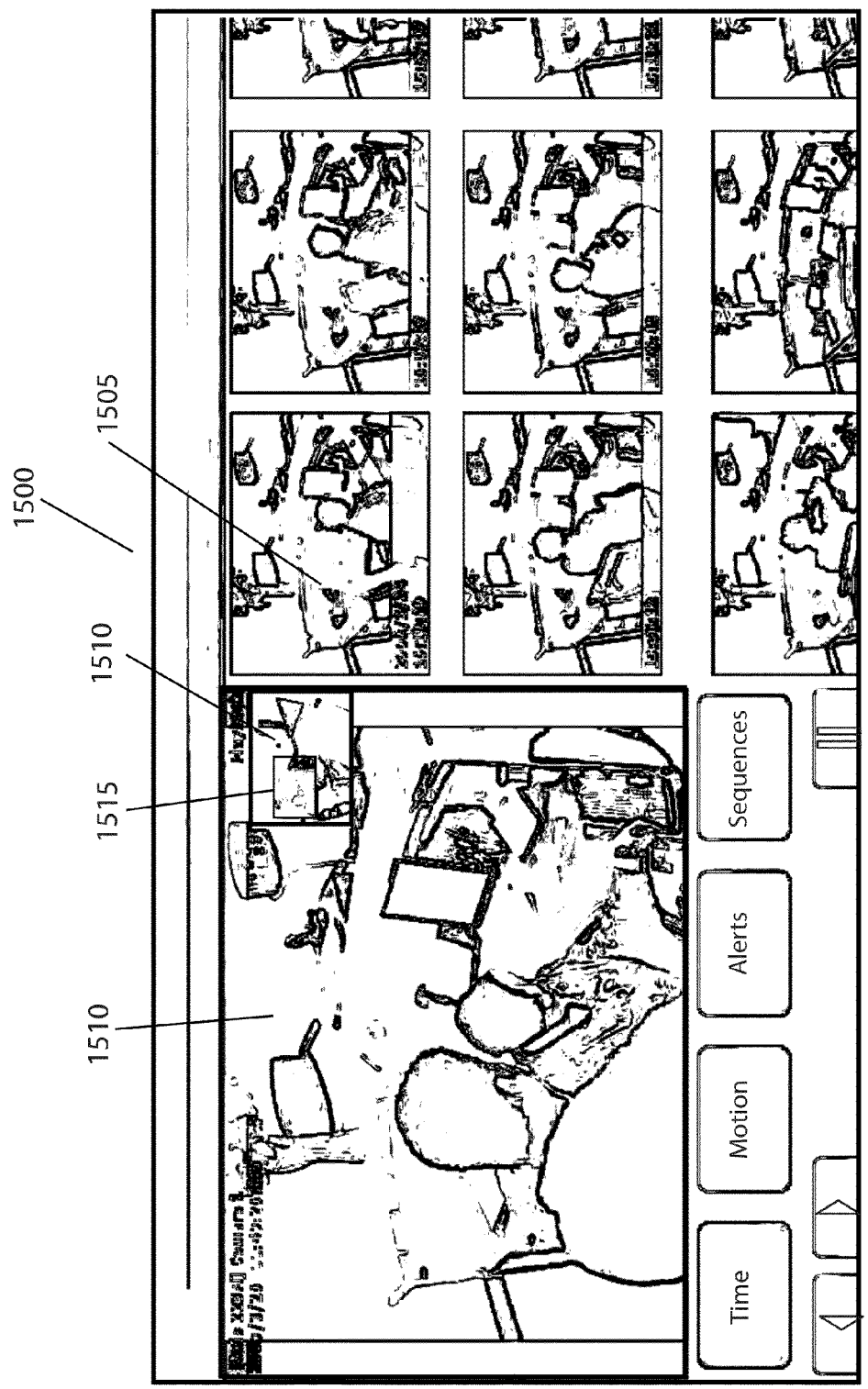

METHOD AND SYSTEM FOR VIDEO COLLECTION AND ANALYSIS THEREOF

CROSS-REFERENCE TO RELATED APPLICATION

This application claims the benefit of U.S. Provisional Application Ser. No. 61/040,468 filed Mar. 28, 2008, entitled "METHOD AND SYSTEM FOR VIDEO COLLECTION AND ANALYSIS THEREOF," the entire disclosure of which is incorporated by reference herein.

FIELD OF THE INVENTION

The present invention relates to a method and system for collecting and analyzing data feeds from various sources.

BACKGROUND OF THE INVENTION

There are various fields, such as video surveillance, where multiple streams of data, from various sources, may be collected and analyzed. For example, signals from one or more video cameras and/or other monitoring sensors may be collected and simultaneously sent to a control station to be displayed on one or more display monitors. In addition to being displayed, the visual streams may also be recorded and stored.

In a control station, for example the monitors displaying the visual information from the video cameras, may be viewed and analyzed by a human operator. The human operator may be, for example, a security officer, who will be scrutinizing the displays for suspicious activity. This analysis may be performed on the live feeds coming in from the cameras, or it may be performed on earlier, stored signals.

In the past, the analysis process of this visual information may become quite daunting, especially when surveillance is performed with many cameras and/or on a large area. Since a human operator has all limitations native to humans, he or she may miss certain events that are displayed on the monitors. It is therefore advantageous, to provide a system that can assist human operators analyzing large amounts of visual data that solves the deficiency of the prior art systems.

In order to overcome the above deficiencies in the prior art, a system is needed to provide rich camera management that enables sophisticated recording and archiving of video and automated video alerts based on intelligent analysis and detection. A system is needed which allows users monitoring multiple video and other monitoring sources to easily access and interpret such information and data in a manner that allows greater flexibility and enhanced functionality.

SUMMARY OF THE INVENTION

In one embodiment there is disclosed a computer implemented method of performing video surveillance on a computer system, wherein the computer system comprises a video and a display with a graphical user interface, the graphical user interface including a source window to view play back of the video. The surveillance method comprises the steps of determining an area of interest of a frame of the video based upon a selection of the area of interest within the source window, and the step of generating a plurality of windows within the graphical user interface, each of the windows displaying the area of interest of the frame of the video at a point in time, wherein the graphical user interface includes controls to manipulate the playback of the video from a point in time relative to each displayed portion.

In another embodiment, there is disclosed a computer implemented method of detecting activity within a video on a computer system, wherein the computer system includes a video and a display with a graphical user interface. The surveillance method comprises the steps of acquiring a reference frame from the video, acquiring a comparison frame, comparing the pixels of the reference frame to the pixels of the comparison frame to detect pixels that have changed, showing at least a portion of the video on the graphical user interface, showing the change in pixels on the graphical user interface by coloring the changed pixels with a pre-defined color, and gradually altering the different color to reveal the actual color of the changed pixels.

In another embodiment, there is disclosed a computer implemented method of performing video surveillance on a computer system, wherein the computer system comprises a video and a display with a graphical user interface, the graphical user interface including a map designating a location of at least one monitoring sensor and a source window to view play back of a video. The surveillance method comprises the steps of displaying a video being detected by a monitoring sensor and displaying a section of the map representing the location of the monitoring sensor detecting the video.

BRIEF DESCRIPTION OF THE FIGURES

Preferred features of the present invention are disclosed in the accompanying drawings, wherein similar reference characters denote similar elements throughout the several views, and wherein:

FIG. 15B is a section of an overview of FIG. 15A showing the selection of an area of interest;

DETAILED DESCRIPTION OF THE CERTAIN EMBODIMENTS

Figure 1:
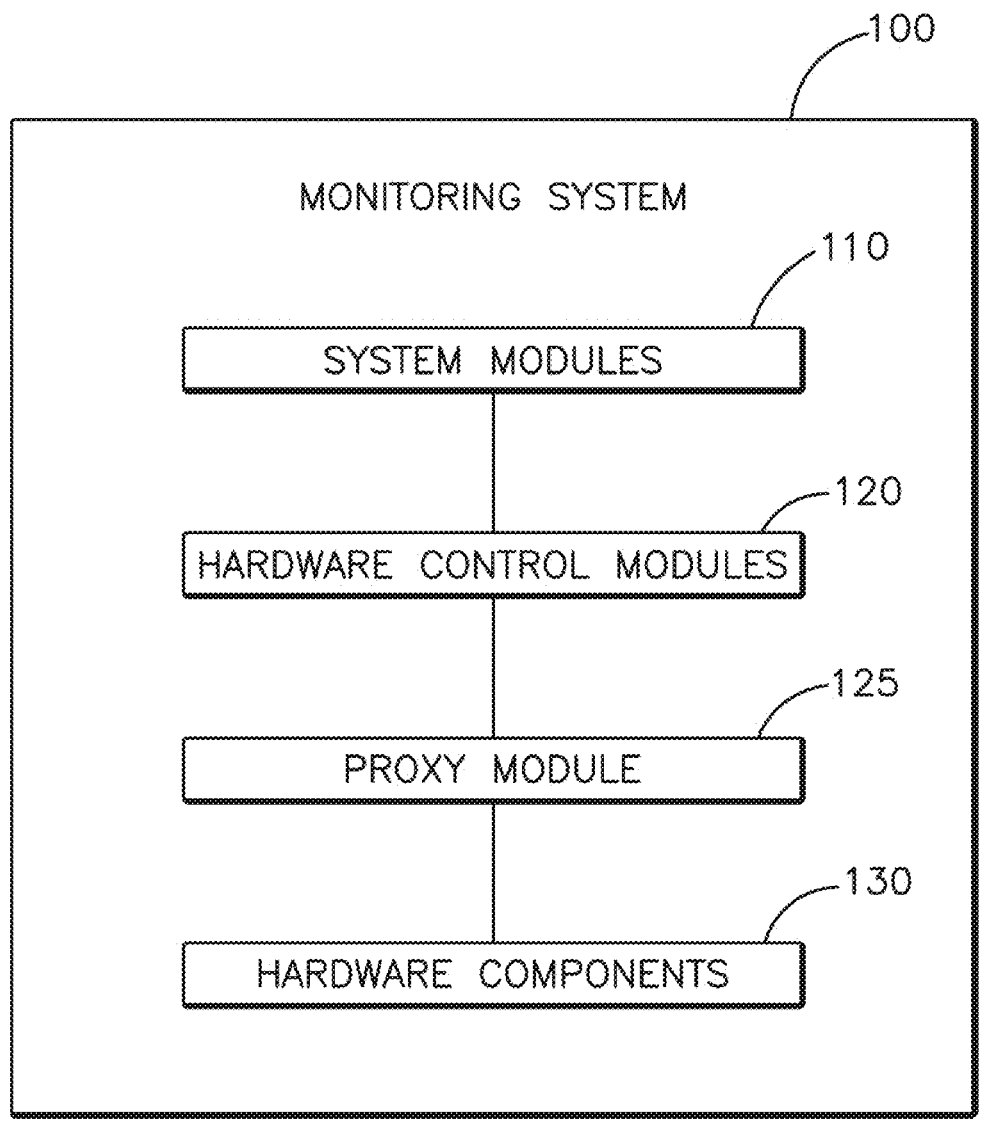
FIG. 1 is an overview of system components in accordance with an embodiment of the present invention.

Certain embodiments of the present invention will be discussed with reference to the aforementioned figures, wherein like referenced numerals will refer to like components. It should be noted that references in the specification to phrases such as "one embodiment" or "an embodiment" means that a particular feature, structure or characteristic described in connection with the embodiment is included in at least one embodiment of the invention. The appearances or phrases such as "in one embodiment" in various places in the specification are not necessarily, but can be, referring to same embodiment. The embodiments illustrate a system that integrates intelligent analytics and enables sending camera views to local or remote displays over the network. The embodiments further illustrate a system that greatly enhances productivity by facilitating and expediting video review and analysis by a human user.

Generally speaking, in one embodiment of the invention a monitoring system assists users in monitoring events, and includes a scalable computer system, operative with programming and related databases, the computer system connected to one or more monitoring sensors such as, for example, video cameras, network video recorders, scanners, keycard sensors, infra-red cameras, microphones, access control systems, pressure monitoring systems, or other similar devices. The system allows operators to quickly monitor a large number of cameras and auxiliary monitoring sensors in an efficient and expeditious manner.

In one embodiment a monitoring system comprises a plurality of various monitoring sensors deployed throughout an area that is subject to observation. The monitoring system preferably receives information from these monitoring sensors or monitoring devices and presents the information to the users in a structured way that allows the users to better monitor the situation.

For example, the monitoring system may provide a user of the system with a visual interface showing locations of various monitoring sensors overlaid over a schematic representation (such as a map) of an area being monitored. Thus, a user may, for example, select to view a stream of video information from a specific camera based upon its location in the area being monitored instead of having to keep a mental map of the various locations of the monitoring sensors. This may allow the user to find the location of a specific event or follow the movement of a subject of observation from the field of view of one monitoring sensor to the field of view of another monitoring sensor, faster and more efficiently than would be otherwise possible.

In various embodiments of the monitoring system, the system may merge various types of data, received from various monitoring sensors, in order to present the user with an optimal overview of a situation. Since various monitoring sensors provide various types of data, for example video cameras provide video streams, microphones provide audio data, access control systems provide events such as notifications of incorrect pass key entries, or other types of data, it is useful to have this information merged together in a manner that allows a user to extract the necessary information in an expedient manner. For example, a user viewing a stream of video information received from a video camera, may also receive information from a keypad monitoring sensor that is located in the video camera's field of view. This will allow the user to visually monitor the video feed data and monitor the data from the keypad monitoring sensor simultaneously. In certain embodiments the monitoring system may also analyze streams received from various monitoring sensors and embed metadata into those streams. As described in further detail below, information added to metadata may be anything relevant, for example a description of events being observed by the monitoring sensor, type of monitoring sensor performing the observation, time and date of observation, environmental properties at time of observation (e.g., temperature), or other related data.

In various embodiments of the monitoring system, the information received from various monitoring sensors may be analyzed by the system, in order to provide the users of the system with alerts to facilitate effective surveillance. For example, certain events or sequences of events may trigger corresponding alerts. If, for example, there is a loud sound in the vicinity of a particular camera that is sensed by, for example, a microphone, an alert may be sent to a user and a window displaying the stream of video information from that camera can be displayed to the user. Alerts and events can be configured to occur as a result of any event or sequence of events. Various alerts and events are described in further detail below.

In various embodiments of the monitoring system, the information received from various monitoring sensors may be analyzed by the system, and enhancements may be added to the information. For example, a video stream received from a video camera may be analyzed for motion, and where motion is detected the images may be altered or enhanced, by, for example, adding a red hue over the moving object. While any type of analysis and enhancement may be employed, certain types of analysis are described in further detail below.

In various embodiments, the monitoring system can provide users with additional functionality to assist them with reviewing streams of video information. By way of non-limiting example, monitoring system may allow users to analyze the stream of video information as a time line, by providing a user with a control that allows the users to select and view specific time spans from the stream of video information, and to bookmark those time spans. These bookmarks may contain additional information, such as, for example, information related to why the bookmark was placed, who should review the bookmark, or any other relevant information.

Figure 15A:
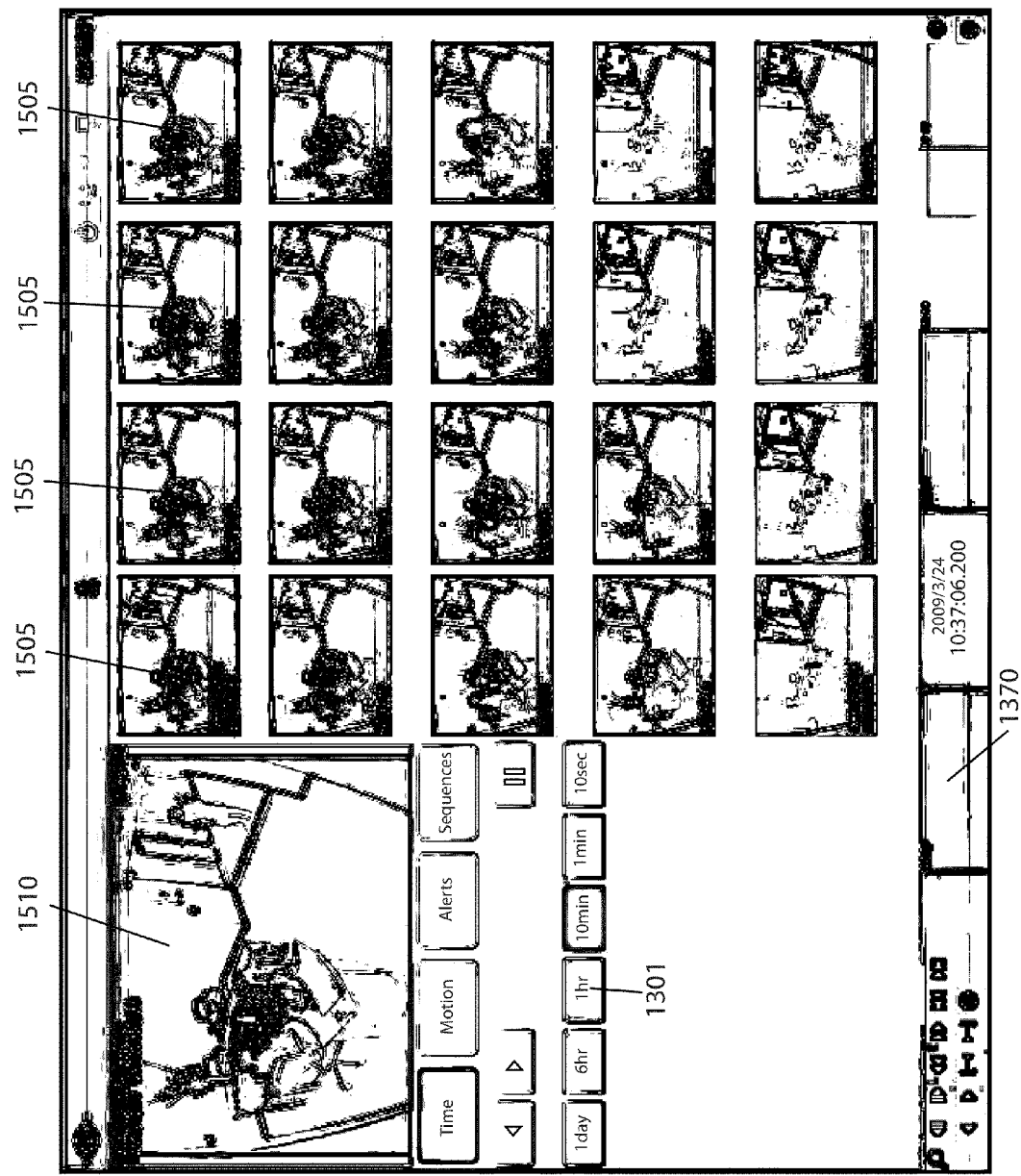
FIG. 15A is an overview of a thumbnail review graphical user interface in accordance with an embodiment of the present invention.

As described in further detail below with reference to FIGS. 15A and 15B, monitoring system 100 can allow users to focus on specific areas of streams of video information by giving users the ability to pan to, tilt to, or zoom in on, a certain area of a video stream. The system can also include the functionality that permits users to simultaneously view multiple videos of differing resolution sizes, from various points in time, of the area the user focused on. It should be noted that the multiple videos can be thumbnail sized or can be configured to be any size depending on the vision of the user, and the resolution, size, and number of monitors displaying the multiple videos.

Although the methods and systems are referenced primarily in the context of surveillance and video cameras, it will be understood by persons of ordinary skill in the art that the present invention and its various embodiments could be applied to any situation where monitoring of streams of information is useful. Moreover, it will be understood that the methods and systems described herein are not limited to any particular type of monitoring device.

With reference to FIG. 1, there is shown and described an overview of an embodiment of a monitoring system 100. As will be described in further detail below, the system preferably includes system modules 110 (described in detail with reference to FIG. 3) that enable functionality of the monitoring system 100, hardware control modules 120 (described in detail with reference to FIGS. 5-8) that preferably enable the system modules 110 to communicate with the hardware components 130 of monitoring system 100, and hardware components 130 (described in detail with reference to FIG. 2) which allow the system to operate and interact with users.

Because different systems and hardware components frequently have different syntaxes for information streams and the accompanying streams of metadata related to those information streams, a proxy module 125 may be included in certain embodiments of monitoring system 100, to perform the function of an interpreter thereby, for example, allowing third party hardware, such as cameras, to be communicatively connected to the system. By way of non-limiting example, proxy module 125 may be used to convert the metadata specific to a hardware or software component that sends or creates the metadata to a syntax neutral format.

Figure 2:
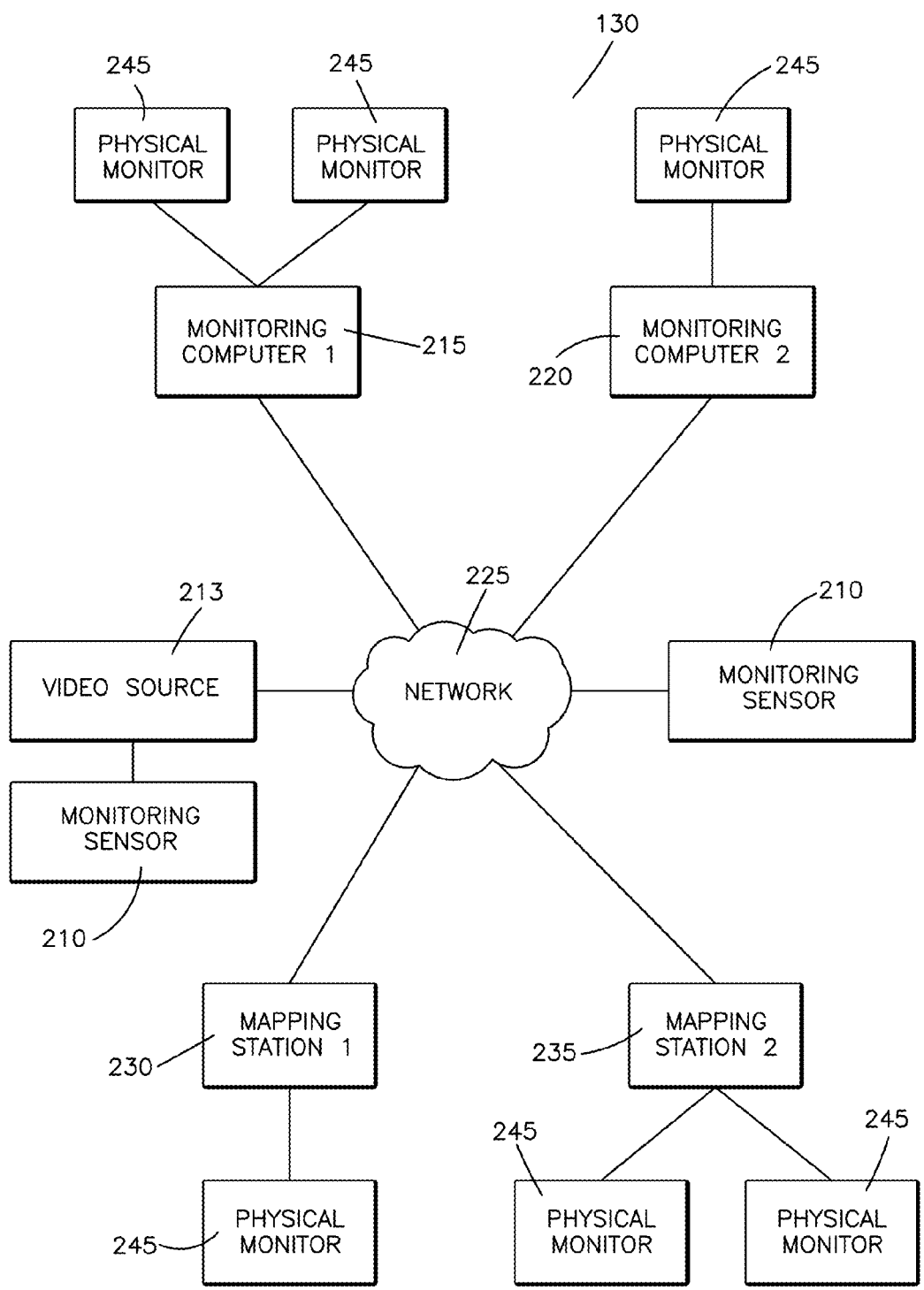
FIG. 2 is an overview of the hardware system architecture in accordance with an embodiment of the present invention.

With reference to FIG. 2, there is shown and described an embodiment of a monitoring system 100 including monitoring computers 215, 220 mapping stations 230, 235, monitors 245, databases (which may be part of monitoring computers 215, 220, mapping stations 230, 235, or separate), various monitoring sensors 210, and programming for providing functionality to one or more users. The components of monitoring system 100 are preferably in communication with one another by being communicatively interconnected via a network 225 which may be an internal network, such as a local area network or LAN, or an external network such as the internet, extranet, wide area network, metropolitan area network, or any other network. A monitoring sensor 210 can be connected directly to the network 225 or a monitoring sensor 210 can be connected to a video source 213, which can store the video information stream from the monitoring sensor 210 as it sends the video information stream to the network 225.

In various prior art monitoring systems, the various components would be connected to hardware switching mechanisms that would include devices such as video matrix switches, quads, multiplexers, splitters, or other costly and robust hardware devices. The use of these hardware switches necessitated large expenditures on purchase and maintenance of those switches. Additionally, expansion of the hardware switching mechanisms and interconnection of various premises housing hardware switching mechanisms is difficult, space consuming, costly, and limited. Further, the hardware switches would typically hinder the functioning of the prior art monitoring systems since signals sent by the users would be delayed by having to go through the hardware switching mechanism before reaching their destination. Furthermore, the use of hardware switching mechanisms in surveillance systems necessitated long training for operators and, in certain instances, the operators needed to memorize details about the hardware components in order to access them.

The use of communication over a network 225 using a protocol such as Transmission Control Protocol and Internet Protocol ("TCP/IP") removes the need for the hardware switching mechanism and expedites the functioning of the system. Use of Internet Protocol ("IP") instead of hardware switching, among other benefits, confers advantages such as broad use of numerous devices all of which are compatible with the monitoring system 100, no vendor lock-in since IP switches can be obtained from a number of independent vendors; transmission error resiliency since TCP allows reliable transmission of data through noisy environments; zero transmission loss since unlike analog copper based transmission that degrades based upon transmission distance, information can be sent using IP with no loss regardless of the distance; and ease in set up and management as compared to the hardware switching mechanisms.

Monitoring computers 215, 220 and mapping stations 230, 235 may be any type of computer processor, for example, they may be personal computer systems running any type of operating system such as, for example, Microsoft Windows, Mac OS, or Linux. Monitoring computers 215, 220 preferably include networking capabilities. Monitoring computers 215, 220 may be configured for optimal use in monitoring applications and thus may include keyboards, touch-pads, joysticks, microphones, speakers, printers and/or any number of additional components and peripherals. In certain embodiments, the mapping stations 230, 235 can include some or all of the functionality of monitoring computers 215, 220, and may even replace monitoring computers 215, 220.

The monitoring computers 215, 220 are preferably connected to at least one monitor 245, though multiple monitors 245 may be utilized, The monitors may be displays of any type including but not limited to LCD, projection, CORT, and any other type of display.

In use, the stream of information is sent by the monitoring sensor 210 (which may be a video camera or any other monitoring sensor as described above), via network 225, to the mapping stations 230, 235. Mapping stations 230, 235, as described in further detail below, are preferably used to analyze the stream and/or send the stream of information to a selected monitoring computer 215, 220 where the stream of information may be viewed and/or analyzed by the users of monitoring computer 215, 220 on their respective monitors 245. It should be noted that the mapping stations 230, 235 can be configured to send the stream of information to every monitoring computer 215, 220, or select monitoring computers 215, 220 in response to input from users of mapping stations 230, 235, according to an algorithm, or a combination of both.

Figure 3:
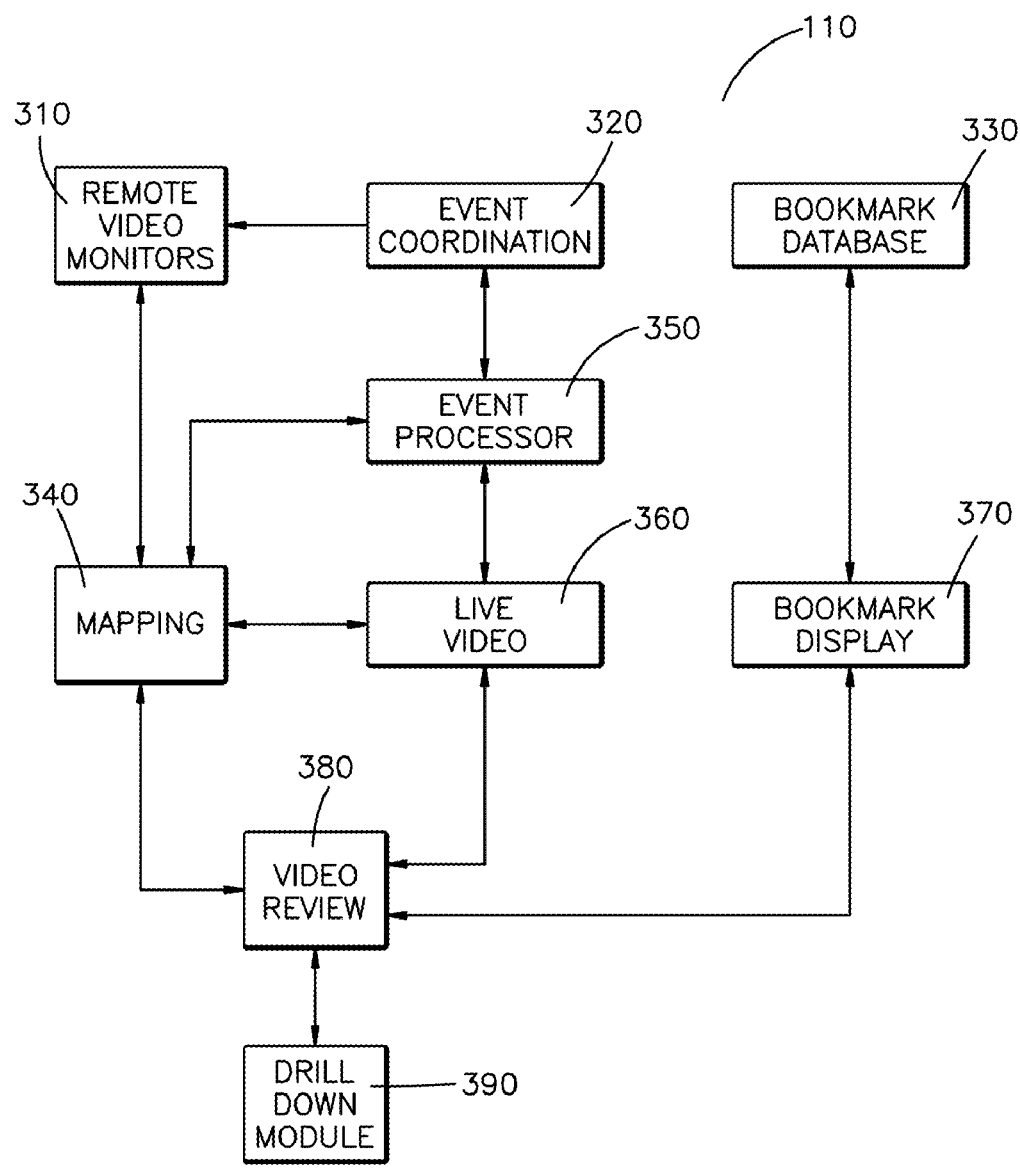
FIG. 3 is an overview of the software modules of a system in accordance with an embodiment of the present invention.

With reference to FIG. 3, there is shown and described a diagram of various system modules 110 of an exemplary embodiment of the monitoring system 100. The monitoring system 100 is just exemplary and should not be interpreted as limiting the methods and systems, described herein, in any manner. Some of the modules of the monitoring system 100 are software modules, while others are hardware components, as described in further detail below. The system modules shown in FIG. 3 are software modules that can be running on any number of computers or other hardware elements of monitoring system 100 (e.g. monitoring computers 215, 220; mapping stations 230, 235).

As shown in FIG. 3, the software live video review module 360 represents a module that preferably controls monitoring sensors 110 and receives streams of monitoring information from those monitoring sensors 110 and passes these streams to software mapping module 340, software event coordination module 320, and software video review module 380. In various embodiments the live video review module 360 may receive instructions and/or data from mapping module 340, event coordination module 320, and video review module 380. By way of non-limiting example, the event coordination module 320 may, without user input, instruct live video review module 360 to instruct the monitoring sensor 210 to pan to, tilt to, or zoom in on an area where a pre-determined event is detected as taking place. Additionally or alternatively, the mapping module 340 may also instruct the live video module 360 to instruct the monitoring sensor 210 to pan to, tilt to, or zoom in on a particular area in response to a request by a user. As described in further detail below, live video review module 360 preferably allows users to conduct monitoring on the live information streams that are received As described in further detail below, video review module 380 preferably allows users to conduct monitoring on previously recorded information streams received from monitoring sensors 210. The information streams may be recorded by and received from video source 213, although in alternate embodiments the information streams may also be recorded by live video review module 360.

Video review module 380 allows users to analyze the previously recorded streams. As described in further detail below, the video analysis of information streams may be assisted by analyzing specific time periods of the video stream, using the software drill down module 390, and incorporating bookmarks into the recorded streams. Drill down module 390 preferably divides the recorded streams of video information into sections of specific length of time, and displays those portions together on the monitor, to facilitate analysis. Bookmarks may be any type of data or computer code that can be used by a software bookmark display module 370 to direct a user of a mapping station 230, 235 or monitoring computer 215, 220 to a specific place or section of a recorded stream of video information. The bookmarks are preferably stored in an accompanying bookmark database controlled by the bookmark database module 330. The working of the bookmark display module 370 is further described below in reference to FIG. 11. The working of the drill down module is described below with reference to FIGS. 14-19.

Mapping module 340 preferably provides the functionality of the mapping stations 230, 235. As described in further detail below, mapping module 340 preferably manages (and allows users to manage) how and which information streams (live streams from live video module 360 or recorded streams video review module 380) are outputted to the users monitors 245, via the remote video monitor module 310.

The event coordination module 320 detects events for which an alert or alarm may need to be issued. The stream of information sent by monitoring sensor 210 can be received, via network 225, by event coordination module 320, which can analyze the stream of information to determine whether a particular event is occurring before passing the stream to the event processing module 350. If an event is occurring (e.g. motion has been detected), event coordination module 320 may send an alert or alarm to event processing module 350. Additionally or alternatively, event coordination module 320 may also embed information, related to the event being detected, into the stream received from monitoring sensor 210, or into the metadata of that stream. By way of non-limiting example, the information embedded into the metadata or the stream may include information directed to which cameras, audio sources, and information streams are related to the alert.

As described herein, event coordination module 320 may detect certain events by using data received from monitoring sensor 210 or by other event detection methods. For example, in certain embodiments a stream of video information received from monitoring sensor 210 may be analyzed by the event coordination module 320 to detect events such as loitering, motion, or a loud sound. In other embodiments, the monitoring sensor 210 or the video source 213 may itself include its own software modules that may analyze the visual information it receives. For example, if monitoring sensor 210 is a video camera, the video camera itself may detect events such as loud noises (if the video camera contains a microphone), or motion, and embed information about those events into the metadata accompanying the stream of information that video camera monitoring sensor 210 sends via network 225 to the event processing module 350. Upon reception of a stream of video information from such event detecting video camera monitoring sensor 210, event coordination module 320 may retrieve the information, about the events, from the metadata of the stream of video and use that data in its analysis.

When events are detected, software event coordination module 320 can further analyze the types and sequences of events. Event coordination module 320 is preferably configured to issue alarms or alerts in response to specific sequences of events. By way of non-limiting example, the event coordination module 320 may ignore an event if it detects that multiple incorrect passwords were inputted by various people into keypad monitoring sensor 210 in the field of view of a video camera monitoring sensor 210, but may issue an alarm if a single person inputs multiple wrong passwords.

When event coordination module 320 detects an event or sequence of events that trigger an alarm or alert, the event processing module preferably sends the alert or alarm to the event processing module 350. Event processing module 350, upon receiving an alert or alarm, may transmit instructions to the mapping module 340 and/or live video review module 360. By way of non-limiting example, the event processing module may send instruction to mapping module 340 to send a specific information stream to the remote video monitor module 310 which, in turn, can display the information stream (which may include a video information stream, an alert or alarm, and/or any other relevant information) on monitors 245 of mapping stations 230, 235.

By way of another non-limiting example, the event processing module 320, may transmit instructions to the live video module 360, which may include instructions relating to the operation of the monitoring sensors 210 creating the information streams, for example, in the example above, describing a single person incorrectly inputting a password, the event coordination module 320 may instruct the monitoring sensor 210, which can be a camera, to pan to, tilt to, and zoom in on the face of the person incorrectly entering the password. Event processing module 350 preferably directs the alerts and/or alarms received from event coordination module 320 to the relevant monitoring computers 215, 220, mapping stations 230, 235 and their respective monitors 245. The alerts displayed on the monitors 245 may take on any form, for example, they may be messages, sounds, flashing lights, or other warning methods as described in further detail below. It should be noted that the event processing module 350 may send alerts to every monitoring computer 215, 220 or mapping station 230, 235 in the monitoring system 100, or to only select monitoring computers 215. For example, alerts for major events (for example, an extremely loud sound such as an explosion) may be sent to every computer 215, 220, 230, 235 on the network, alerting the users of a potential disaster, whereas alerts for minor events, for example loitering, may be sent to a specific individual's monitoring computer 215 that is monitoring the field of view of a camera wherein the loitering is occurring. In certain situations the event coordination module 320 may bypass the event processing module 350 and may, itself, send the alerts or alarms to the various monitoring computers 215, 220 and or mapping computers 230, 235, to be displayed on physical monitors 245 via remote video monitor module 310.

The alerts are preferably displayed to the users by the mapping module 340 or live video review module 360 (depending on whether a user is in a mapping mode or live video review mode) as described in further detail below with reference to FIGS. 9 and 10 respectively. As described in detail below, the users may then inspect the alert, by using GUI 1100 or GUI 1200, and mark the alert as handled and/or provide additional information related to the alert. This input from the users is preferably collected by the event processor module 350 and sent to event coordinator module 320 which may keep track of alerts and any operation performed in relation to the alerts.

It should be noted that the various modules shown herein are for illustrative purposes only. In various embodiments the functionality of the modules may be assumed by a single software module, or several software modules. Likewise, the system should not be limited to any specific type of hardware, any type of computer, sensor, display device, or other components may be used.

Figure 4A:
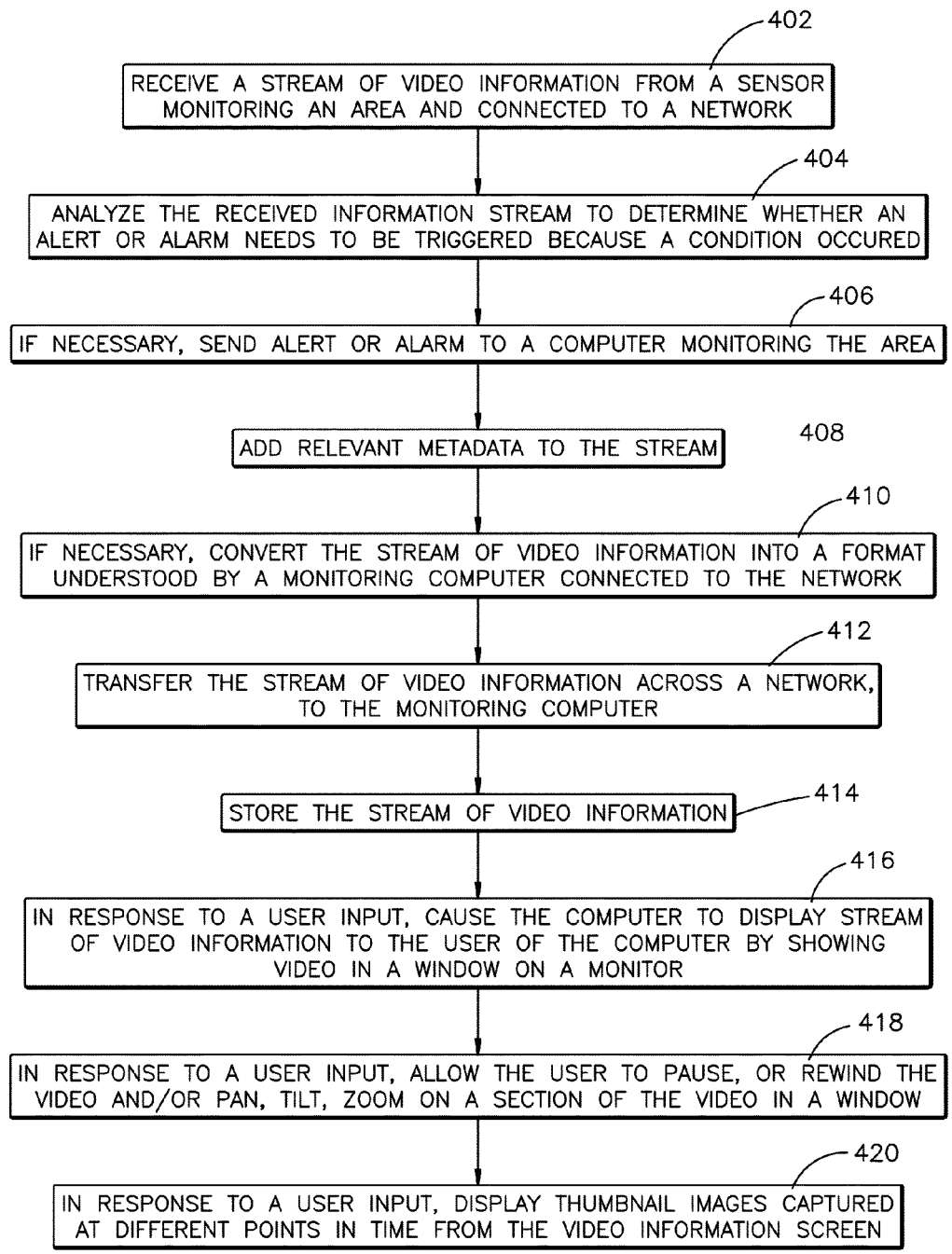
FIG. 4A is a flow diagram of an exemplary operation of the monitoring system in accordance with an embodiment of the present invention.

With reference to FIG. 4A, there is shown and described an embodiment of an exemplary operation of an embodiment of monitoring system 100. It should be noted that this exemplary operation should not be interpreted to limit the systems and methods described herein. In various embodiments many other operations may be performed by and on the monitoring system 100. Additionally the system may perform the steps described below in a different order than described.

First, the monitoring system 100 receives a stream of information from a monitoring sensor 210 (e.g. camera) across network 225. Step 402.

Next, the monitoring system 100 analyzes the received information, as described above, by for example using event coordination module 320. Step 404.

If an event is detected, the event coordination module 320 sends an alert or alarm to a computer monitoring the area, for example monitoring computer 215. Step 406. As described above, this alert can be sent to one of a number of monitoring computers 215, 220 and mapping stations 230, 235.

The monitoring system 100 may then add metadata to the stream. As described in further detail below, the metadata may include any information relevant to the stream. The data handling may be performed by metadata stream handler 545, abstract metadata provider 560, specific metadata provider 575, and metadata renderer 545. Step 408.

The monitoring system 100 then converts the received stream of video information to a format understood by a monitoring computer 215. The conversion may be performed, as described above, by the display engine 515, video stream handler 540, abstract video provider 555, and specific video provider 570. Step 410.

The monitoring system 100 preferably sends the stream of video information across network 225 to the monitoring computer 215. Step 412.

The monitoring system 100 preferably stores the stream of video information somewhere on the monitoring system 100, for example a small portion of the stream may be stored in cache, additionally or alternatively it can store the entire stream of video information for example on video source 213 which may include a hard-drive, server, back-up tape, or any other storage medium (not shown) that is preferably connected to the monitoring system 100 via the network 225. Step 414.

If a user submits a proper input, as described below with reference to FIGS. 9-11, the monitoring system 100, by using layout module 520, may display a window object containing the video stream to the user. Step 416.

As described in more detail with reference to FIGS. 9-11, the monitoring system 100 preferably allows the user to perform operations such as play, pause, rewind, on the video stream. Additionally, in response to a proper user input, the monitoring system 100 preferably allows the user to pan to, tilt to, or zoom in on a section of a video in a window. Step 418.

As described herein with reference to FIGS. 15-19, in response to a proper user input, the monitoring system 100 preferably allows the user to display, on the monitor 245, thumbnail images captured at different points in time from the video information monitor. Step 420.

Figure 4B:
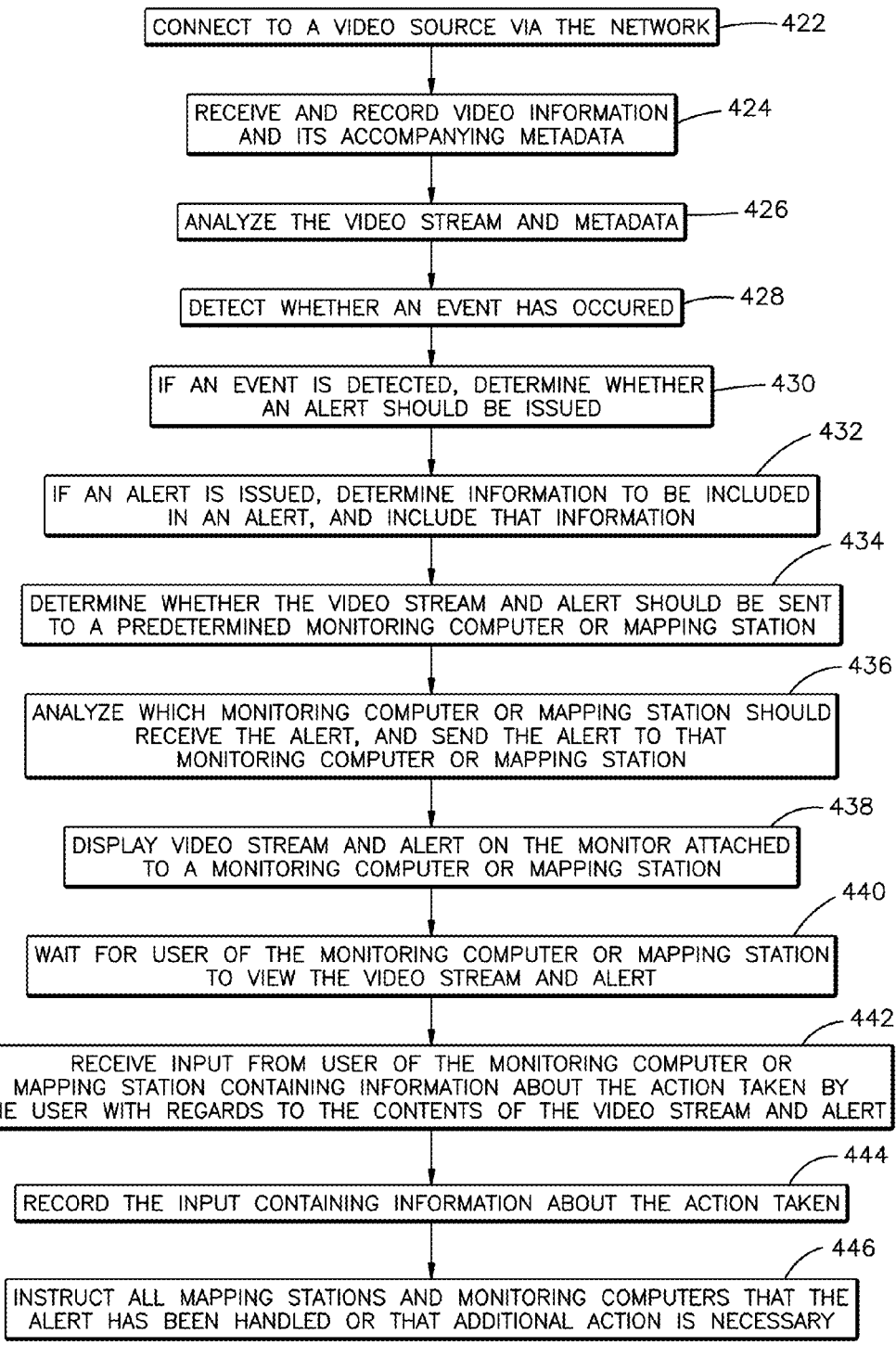
FIG. 4B is a flow diagram of an exemplary operation of the event handling aspect of the system in accordance with an embodiment of the present invention.

With reference to FIG. 4B, there is shown and described another embodiment of an exemplary operation of another embodiment of monitoring system 100. It should be noted that this exemplary operation should not be interpreted to limit the systems and methods described herein. In various embodiments many other operations may be performed by and on the monitoring system 100. Additionally the system may perform the steps described below in a different order than described.

First, the video source 213 of monitoring system 100 connects to monitoring sensor 210 via network 225. Step 422. As discussed above in alternate embodiments the monitoring sensor 213 may be connected directly to video source 213.

Next, the video information stream and its accompanying metadata, sent by monitoring sensor 210, can be received and recorded by video source 213. Step 424.

Next, the video stream and its attached metadata is analyzed internally by video source 213. Step 426.

If video source 213 detects an event, it preferably sends the event data, through proxy module 125, to event coordinator module 320. Step 428.

Next, event coordinator module 320 can examine the event data and determine whether the event should cause an alert to be triggered. Step 430.

Next, event coordinator module 320 can determine what monitoring sensors 210 are relevant to the alert and can append this information to the metadata of the video information stream. Step 432.

Next, if a condition such as a specific level of importance of an alert, is ascertained, the event coordinator module 320 can send the video stream along with the alert to users of monitoring computers 215, 220 or mapping stations 230, 235. Step 434.

Alternatively, the alert may be sent to and received by event processing module 350, which in turn can send the alert to the mapping module 340 or live video review module 360 to be displayed on a specific computer or station, for example monitoring computer 215, or multiple computers for example mapping stations 230, 235. Step 436.

If the alert was forwarded to monitoring computer 215, the live video review module 360 can extract, automatically or in response to user input, the relevant information from the metadata and, using the remote video monitor module 310, display the information stream and metadata from the relevant monitoring sensors 210 on monitor 245 attached to monitoring computer 215. Step 438.

Monitoring sensors 210 display the information stream by first connecting to the video source 213 and requesting the live relay of video from one or more monitoring sensors 210 to a predetermined monitor 245. It should be noted that this is exemplary and in other embodiments the displaying of video from the monitoring sensors 210 on the physical monitors 245 may be performed in other ways, for example by having the monitoring sensor directly send the information stream to the monitor 245, or in any other way heretofore known in the art or hereafter developed.

Next, the operator of the monitoring computer 215, may view the video stream and receive information as to the cause of the alert. Step 440.

After reviewing the information the operator can take whatever action is necessary to handle the situation (e.g. notify security that there is an unauthorized person loitering in a specified location). Next, the operator of the monitoring computer 215, may acknowledge the alert and what steps have been taken. Step 442.

Next, the event processing module 350 can receive the acknowledgement and send the acknowledgement to event coordination module 320. Step 444.

Once the event coordination module 320 receives confirmation that the alert has been handled, the event coordination module 320 instructs all mapping stations 230, 235 and monitoring computers 215, 220 that the alert has been handled and no further action is necessary, or that additional action is necessary. Step 446.

This method allows for configurations of the monitoring system 100, where, for example, certain users can be responsible for specific alerts related to their expertise and/or duties. Additionally, all users of the system maybe appraised of the status of various alerts and sectors of the area being monitored.

Figure 5:
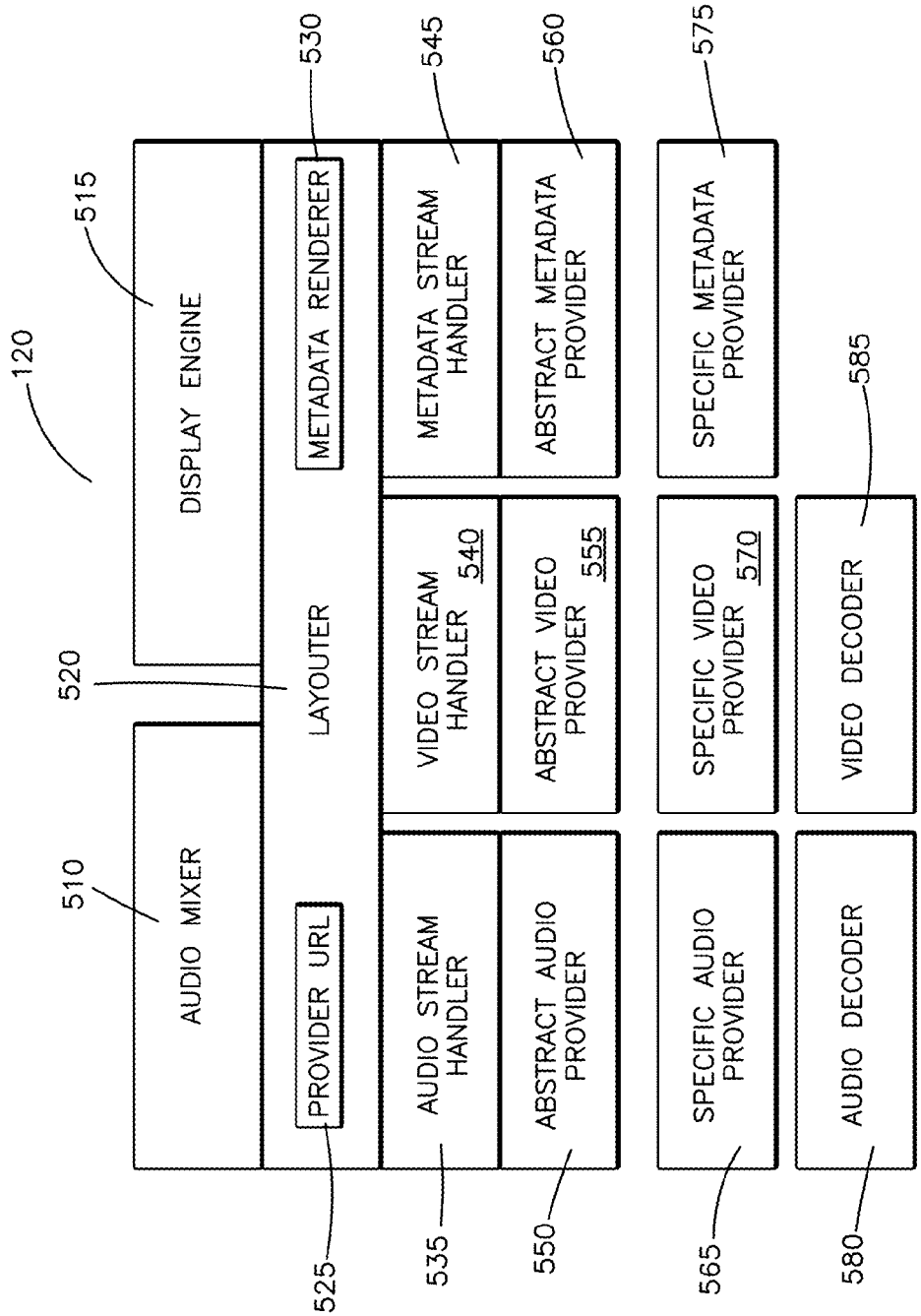
FIG. 5 is an overview of hardware control modules of the system in accordance with an embodiment of the present invention.

With reference to FIG. 5, there is shown and described various components of an embodiment of the hardware control modules 120 of a monitoring system 100, that perform processing and conversion of signals received as information streams from monitoring sensor 210. In various embodiments the shown software components can be loaded onto, and the hardware elements may be included as part of mapping stations 230, 235 and/or monitoring computers 215, 220. As shown in FIG. 5, the system includes modules such as audio mixer 510, display engine 515, layout module 520, audio stream handler 535, video stream handler 540, metadata stream handler 545, abstract audio provider 550, abstract video provider 555, abstract metadata provider 560, specific audio provider 565, specific video provider 570, specific metadata provider 575, audio decoder 580, and video decoder 585. These modules work together to enable functionality of the system. This list is meant to be exemplary and in various embodiments more or fewer components may be utilized. The inclusion of various components will depend on the particular embodiment of the monitoring system 100 and is a matter of design choice that will be apparent to those skilled in the art, e.g. an audio mixer 510, may be excluded from a monitoring computer 215 with no speakers.

Layout module 520 comprises a provider URL module 525 and a metadata renderer 530. Layout module 520 may manage the positioning of window objects on the monitor and process/delegate user inputs such as, by way of non-limiting example, mouse clicks, and key strokes. Layout module 520 may also request audio, video and metadata stream handlers to update themselves. Layout module 520 is initialized by a text string that describes the location of various visual elements. The layout strings may be provided in any way including by reading files on the host computer, or receiving instructions from a central location, or through a network connection. Layout module 520 may be utilized to arrange the various visual components of the GUIs utilized by Users of the monitoring system 100.

Provider URL module 525 is used to locate a resource. By way of non-limiting example, such resource may be a video stream or an audio stream. A provider URL module 525 preferably receives the protocol, user-name, password and location of a certain resource. By way of non-limiting an example of a provider URL module 525 may take on the form of [protocol]://[user-name]:[password]@[host:port]/[provider specific information]. It should be noted that any other method of specifying the location of a resource over a network, as is known in the art, may be utilized. The provider URL module 525 is preferably the way that various components of the system locate resources across the network 225 Metadata renderer 530 is used to extract metadata from the information stream received by the monitoring system 100, and output and/or format the information contained within the metadata.

Audio stream handler 535, abstract audio provider 550, and specific audio provider 565 are software modules that are used by the system to keep track of, and direct audio streams. Whenever an audio stream is received by the monitoring system 100 via the monitoring sensor 210, or previously recorded stream via video source 213, the audio stream handler 35, abstract audio provider 550, and specific audio provider 565 are utilized to process the stream and deliver it to the monitoring computers 215, 220 or mapping stations 230, 235. The working of the audio stream handler 535, abstract audio provider 550, and specific audio provider 565 is described below with reference to FIG. 6. This allows the user of monitoring system 100 to listen to the sound produced by monitoring sensor 210.

Additionally, to process audio streams, and audio decoder module 580 is preferably utilized. Audio decoder module is described below with reference to FIG. 7.

Video stream handler 540, abstract video provider 555, and specific video provider 570 are software modules that are used by the system to keep track of, and direct video streams. Whenever a video stream is received by the monitoring system 100 via the monitoring sensor 210, or previously recorded stream via video source 213, video stream handler 540, abstract video provider 555, and specific video provider 570 are utilized in order to process the stream and deliver it to the monitoring computers 215, 220 or mapping stations 230, 235. The working of the video stream handler 540, abstract video provider 555, and specific video provider 570 is described in further detail below.

Metadata stream handler 545, abstract metadata provider 560, and specific metadata provider 575 are software modules that are used by the system to keep track of, and direct metadata embedded in information streams. Whenever an information stream is received by the monitoring system 100 via monitoring sensor 210, or previously recorded stream via video source 213, the metadata stream handler 545, abstract metadata provider 560, and specific metadata provider 75 are utilized in order to process the stream and deliver it to the monitoring computers 215, 220 or mapping stations 230, 235. The working of the metadata stream handler 545, abstract metadata provider 560, and specific metadata provider 575 is described in further detail below.

Figure 6:
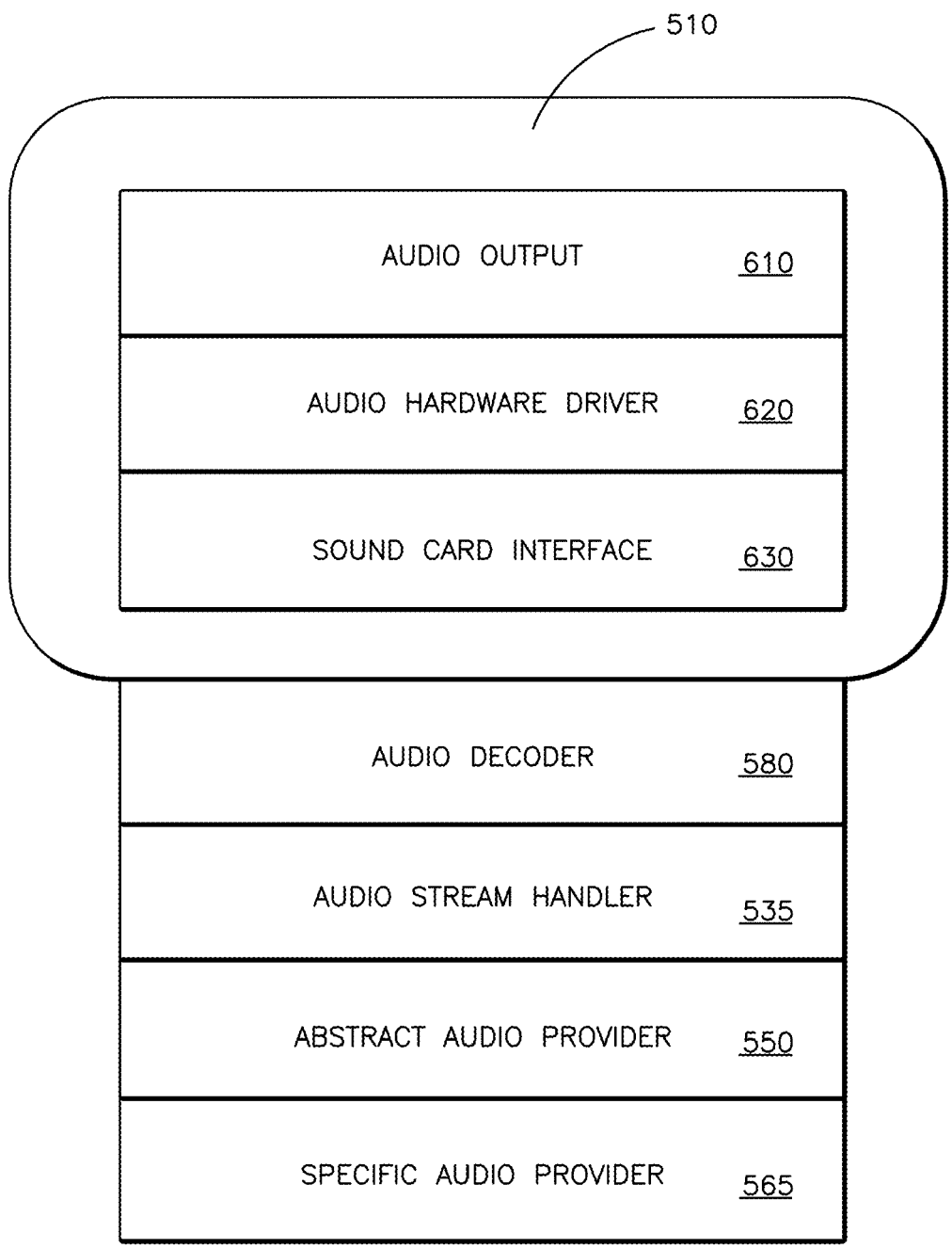
FIG. 6 is an overview of an embodiment of an audio mixer in accordance with an embodiment of the present invention.

With reference to FIG. 6, there is shown an audio mixer 510 connected to the audio stream handler 535, abstract audio provider, 550 and specific audio provider 565 of the hardware control modules 120 of the monitoring system 100 according to an embodiment of the invention. The audio mixer 510 preferably provides access to the audio hardware and handles mixing of multiple audio streams into one unified stream, which may be played through an output device such as speakers. For example, the audio mixer is used to process the sound information received from a monitoring sensor 210 and to deliver the sound elements to the hardware sound card (not shown) of the monitoring computers 215, 220.

As seen in FIG. 6, in one embodiment, the components may include an audio output module 610, an audio hardware driver 620, sound card interface module 630, audio decoder 580, abstract audio provider module 550, and a specific audio provider module 565. In use, the audio decoder preferably decodes h.711 or h.271 audio formats to their uncompressed 8-bit 8 KHz raw format. The decoded bytes are then passed on to a buffer of the sound card interface module 630, which then performs the mixing of the audio with other audio sources. For example, audio information from various monitoring sensors 210 may be combined into one stream. It should be noted that audio mixer 400 is a non-limiting example, any type of buffers or decoders may be utilized to perform any type of relevant conversion to any type of format. The sound card interface module 630 may be any type of software component such as for example MICROSOFT DirectSound.

Figure 7:
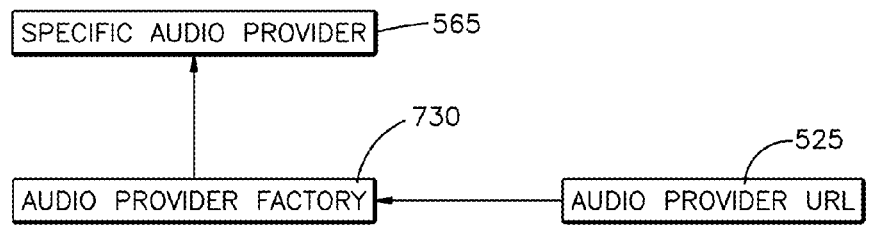
FIG. 7 is an overview of an audio stream handling process in accordance with an embodiment of the present invention.

With reference to FIG. 7, there is shown a diagram of audio stream handling process of the monitoring system 100. In an embodiment of the monitoring system 100, in order to handle an audio stream the system may utilize the specific audio provider 565, audio provider factory 730, and audio provider url 525. The abstract audio provider 550 is an abstraction of an audio source containing the interface definitions of functions such as connect, login, startlive, and any other relevant function. The specific audio provider 565 is an instance that contains the implementation specific to the source. In use, audio provider factory 730 preferably parses the protocol identifier and creates a specific audio provider 565 that matches the specific source from which the audio stream is received. The specific audio provider 565 is then manipulated, by the audio stream handler 535 using the interface of the abstract audio provider 555.

After manipulation, the audio data is decoded by the audio stream decoder 580 and passed to an output device (e.g. speakers, headphones, or any other sound output device) via audio mixer 510 as described above.

It should be noted that the above description of the audio processing components of the monitoring system 100 are exemplary and may be substituted with any other sound processing methodology. It will be apparent to those skilled in the art that various hardware and software modules may be used to achieve the same goals of receiving, manipulating, and transferring sound streams This allows the user of monitoring system 100 to listen to the sound produced by monitoring sensor 210.

Figure 8:
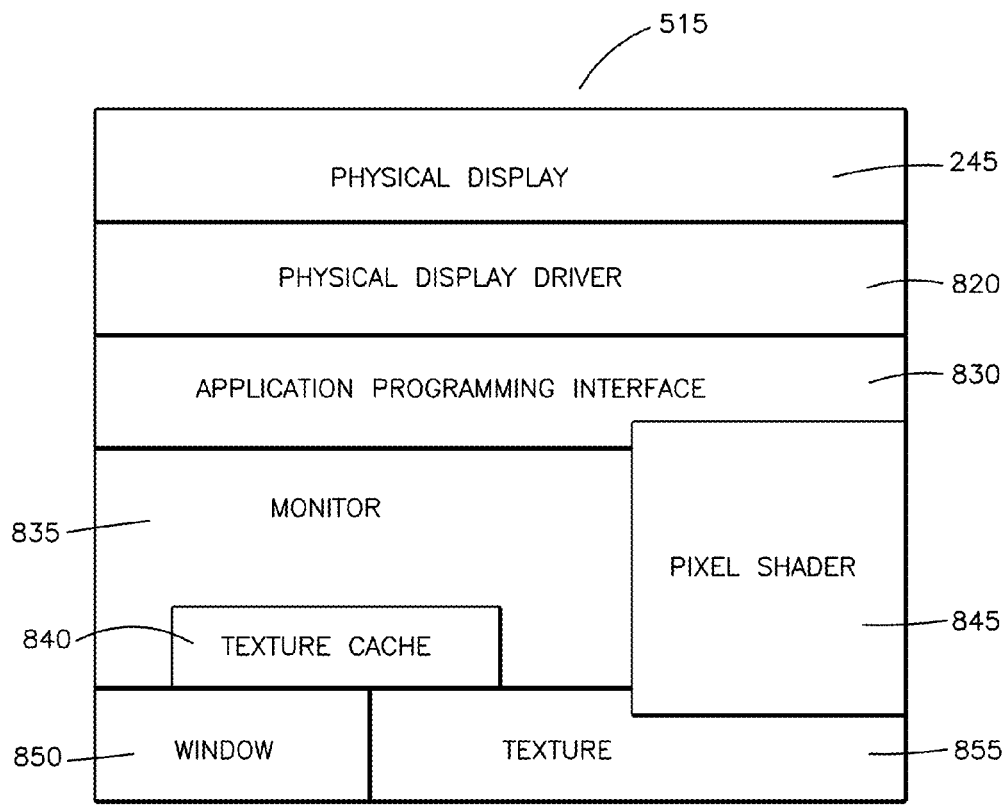
FIG. 8 is an overview of a display engine of an embodiment of the present invention.

With reference to FIG. 8, there is shown a display engine 515 of the hardware control modules 120 of the monitoring system 100 according to an embodiment of the invention. The display engine 515 preferably provides access to the video hardware and may enable outputting various video streams to output devices such as monitors 245. For example, the display engine 515 is preferably used to display a stream of video information from a video camera monitoring sensor 210, as well as various GUI elements such as buttons, icons, windows, and other similar elements.

The display engine 515 may include a physical display driver 820, application programming interface 830, monitor class module 835, pixel shader module 845, texture cache 840, window module 850, and texture module 855. Display engine 515 preferably outputs to a physical display 245.

The physical display 245 may correspond to any type of display as described above. The display driver 820 enables the monitoring system 100 to communicate with the physical display.

Application programming interface 830 may be any type of interface that allows the monitoring system 100 to render graphics on the monitor. By way of non-limiting example, the application programming interface may be Direct X, Direct3D distributed by MICROSOFT Corp., or other programming interfaces.

The monitor module 835 preferably corresponds to a video output on a video adapter (not shown). The monitor module 835 handles the allocation of texture memory in the VRAM of the graphics adapter. The monitor module 835 may be configured to utilize system memory if the graphic adapter runs out of memory.

Texture cache module 840 preferably corresponds to the cache of the video adaptor which may be used to hold frequently used textures and thus may help conserve VRAM.

The pixel shader module 845 contains instructions related to rendering of textures. The pixel shader module 845 may be used to instruct the Graphic Processing Unit of the video card how to convert various pixel formats supported by various video providers (by way of non-limiting example, various surveillance cameras) to Red Green Blue Alpha ("RGBA") format frequently used by graphic adapters, although it should be noted that the invention should not be limited to any specific format. By way of non-limiting example the pixel shader module 845 may be used to convert YcrCb 4:1:1 or ABGR formats to RGBA.

The window module 850 is preferably a collection of instructions to draw various elements of related information within a region. The window module may provide instructions related to the intricacies of dealing with the monitor module 835. The window module 850 may further provide various functions for drawing various geometric primitives such as gradients and filled rectangles, as well as the ability to draw textures such as rectangles. Window module 850 is also used to create window objects (described in further detail below) which are registered through the monitor module 835 and eventually displayed on the physical display 245. The window objects created using window module 850 may repaint themselves in each refresh cycle.

The texture module 855 contains various buffers and commands needed to load bitmap arrays (not shown) from memory, disk files, and/or resources embedded in executable image files. Texture module 855 may consist of a plurality of buffers that are combined through pixel shaders to create a final RGBA output.

With reference back to FIGS. 5 and 8, in an embodiment of the monitoring system 100, in order to handle a video stream the system utilizes video provider 525, a video decoder 585, an abstract video provider 555, a window module 850 and video stream handler 540. In use, the video stream mechanism 700 may be initialized by passing a video stream URL to the video stream provider factory (not shown). Subsequently the video stream handler 540 may receive instructions as to the resolution and pixel format of the display window object 850 associated with the video stream handler 540. The resolution and pixel format instruction may be farther passed to the video provider 555 which in turn may optimize the decoding path. The video stream handler 540 connects a window 850 and a video provider. In use, the video provider 555 may be a video stream from monitoring sensor 210 surveillance camera and the window 850 may be a window object displayed on the monitor.

Layout module 520 may be further used to manipulate video stream handler 540. When a user accesses a portion of a monitor 245 using a peripheral device (e.g. by clicking a mouse), the inputs are relayed to the video stream handler 540. Depending on the input, the video being displaying using the video stream handler 540 may be paused, rewound, played back, or have any other operation performed thereon. Panning, tilting, or zooming functions can also be invoked through the video stream handler 540 which preferably instructs the window 850 to pan tilt or zoom, or alternatively video stream handler can instruct the abstract video provider 555 to move the monitoring sensor 210 to monitor a particular object or instance.

In certain embodiments of the monitoring system 100 the video stream handler 540 can monitor the status of abstract video provider 555. Thus, video stream handler 540 may determine, for example, whether abstract video provider 555 still maintains a connection to its video source 213 or whether the connection has been lost and needs to be reestablished. Layout module 520 periodically causes video stream handler 540 to update itself and thereby can determine the connection status of the abstract video provider 555 and, if the abstract video provider 555 is connected and has a new video frame available, can cause a video frame from the abstract video provider 555 to be transferred to and displayed in window 850 and thereby on the identified monitor 245.

It should be noted that the above description of the display engine and video stream handling is purely exemplary and the invention should not be limited to the components and methods described. Those skilled in the art will appreciate that there are multiple ways of utilizing various modules and hardware elements in order to achieve the desired objects of receiving, transferring, modifying, converting and/or outputting video streams.

With reference to FIG. 5, in certain embodiments of monitoring system 100, metadata stream is received along with an information stream from video source 213. The acquisition of metadata from event coordination module 320 is implemented in the metadata stream handler 545, abstract metadata provider 560 and specific metadata provider 575 with metadata renderer 530 finally creating a visual representation of the metadata. The abstract metadata provider 545 is contains the interface definitions of functions such as connect, login, and any other relevant function necessary to access the metadata. The specific metadata provider 575 is an instance that contains the implementation specific to the source. In use, a specific metadata provider 575 that matches the specific source from which the metadata is received is created. The specific metadata provider 575 is then manipulated, by the abstract metadata stream handler 545 using the interface of the abstract metadata provider 560. These modules allow metadata that can be generated by a monitoring sensor 210 that uses a distinct format to be received by and interpreted by the monitoring system 100 and eventually displayed to the user.

In certain embodiments metadata received from video source 213 may contain detailed information about the event monitored. The ability to receive and interpret this metadata may allow for performance of intelligent analytics and/or enhanced surveillance by a human user of the monitoring system 100. For example, metadata received from video source 213 may be "alert, illegally parked car at (200, 120), (300, 160)" in the video information stream being received from video source 213. Upon receiving such metadata, monitoring system 100 may in one embodiment, use proxy module 125, to convert the metadata to a syntax neutral format. The syntax neutral format may include, for example, a globally unique sensor identifier (provider URL) and a primitive defined as: primitive (1 . . . N)Type (Box, Circle, Text, Polygon) Type specific data (coordinates of the primitive) Color. For example, where the metadata is an alert of an illegally parked car having the form "alert, illegal parked car at (200, 120), (300),(160)." The syntax neutral format may be:

URL: NetDVMS://demo:demo@192.168.7.72:800/[Parking Lot] Camera, Primitive(0)
   Type: Text
   Data: Illegally Parked Car
   Color: Red
Primitive (1)
   Type: Box
   Data: (200,120) (300,160)
   Color: Green,
Time: 12:12:12:222 Mar. 12, 2008.

For every video frame, a new metadata packet may be created and sent to event coordination module 320 which will in turn trigger metadata renderer 530 which will utilize metadata stream handler 545, abstract metadata provider 560, and specific metadata provider 575 as described above in order to create a visual representation of the metadata on the monitor of the user requesting the metadata. In the example used above, if a user of monitoring computer 215 was viewing the video stream from video provider 213 that had the metadata described above, and the user requested to view the metadata, the metadata renderer 530 would cause a green box to be drawn around the illegally parked car and red text informing the user that the car was an "Illegally Parked Car" is caused appear. This will notify the user of monitoring 215 about the illegally parked car, and will focus the user's attention on the specific area where the car is located thereby. It should be noted that it will be apparent to those skilled in the art that metadata may be rendered in any number of ways, and that the method described above is exemplary and should not be interpreted to be limiting.

Figure 9:
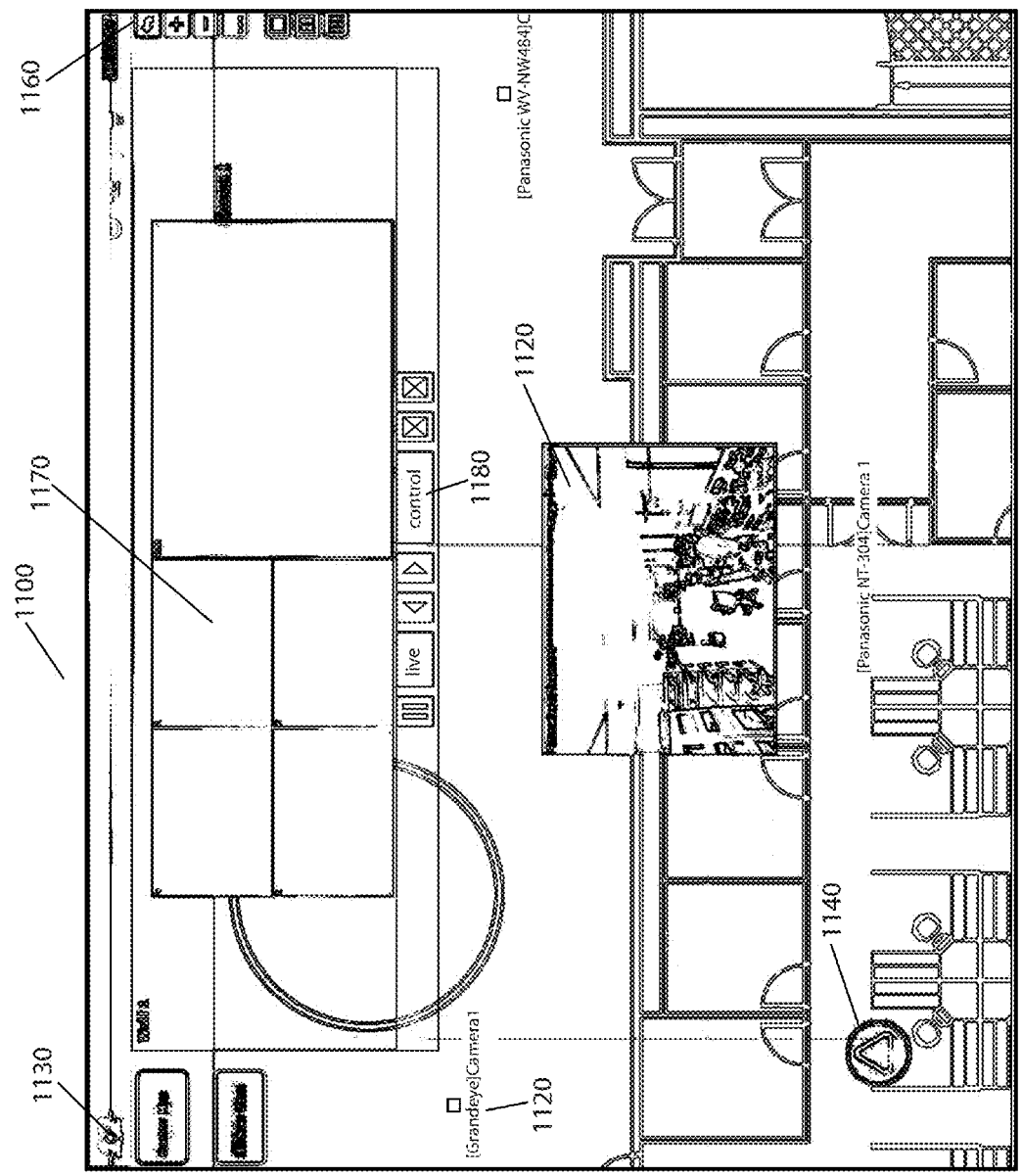
FIG. 9 is an overview of a mapping graphical user interface in accordance with an embodiment of the present invention.

With reference to FIG. 9, there is shown and described an embodiment of a mapping graphical user interface ("GUI") 1100 of a monitoring system 100. This is an exemplary GUI that users of the monitoring system 100 may use to select streams to monitor, receive alerts, send transfer streams to various other monitoring computers and place them graphically on a location map thereby informing the users of the location of the sensor 1120 that is producing the video stream. The interface preferably includes a map 1110 of the area being monitored, various camera icons 1120 and auxiliary sensor icons 1140, alert notification area 1130, map navigation controls 1160, remote monitor controls 1170 and a remote video navigation panel 1180. Navigation panel 1180, may include a button (within the navigation controls 60, or elsewhere) that automatically brings the user to the location of the camera icon 1120 that represents the camera producing the video stream the user is monitoring.

The map 1110 of the mapping GUI 1100 maybe any type of map. It may be geographically accurate, such as one that may be found in a typical atlas, or alternatively it may be a representative schematic or a diagram of the area being monitored. Additionally, the map 110 may be two or three dimensional.

The map 1110 may be navigated, by a user, by using map navigation controls 60. The map navigation controls may allow the users to pan around the map and/or zoom in on areas of interest. The controls may take on any form, for example icons such as arrows, and may be configured to respond to any instruction such as mouse clicks, a touchpad, and/or voice commands.

The map 1110 preferably includes camera icons 1120 and auxiliary icons 40 imposed over the map, with the camera icons 1120 representing the location of various cameras throughout the area being monitored and the auxiliary sensor icons 1140 representing the location of various monitoring sensors throughout the area being monitored. The users of the mapping GUI 1100 may interact with the various camera icons 1120 auxiliary sensor icons 1140 and thereby access the information stream associated with the camera 210 or monitoring sensor 210 being represented by the respective icon. The interaction with the icons 1120, 1140 may be caused in any way including, but not limited to, clicking the mouse pointer over the icon, touching the icon via a touch-pad, referencing the icon via a voice command, or other indicative methods.

When a user selects a camera icon 1120, a video window object 1120 is preferably displayed for the user on the monitor. The video window object 1120 preferably displays the stream of information received from the camera the icon of which was interacted with by the user. The window object 1120 may have permanent controls embedded in it, or the controls may fade in on or out (to preserve viewing area) due to user interaction that may be, by way of non-limiting example, dragging a mouse cursor over a particular portion of the video window object. The controls of the window object may include any useful and compatible control, by way of non-limiting examples the controls may include icons representing buttons to pause, rewind, fast forward the stream and pan, tilt, and/or zoom over the stream and may include controls for additional features (described in further detail below) such as motion-detection, night-vision, etc. The panning, tilting and zooming over the stream may be digital or optical. Thus, the user of the system may focus and enlarge particular areas of interest displayed in the window object 1120.

The mapping GUI 1100 allows the user of the mapping GUI 1100 to select users to monitor various video streams. The mapping GUI 1100 may include monitor icons 1170 representing various computer monitors 245 located throughout the monitoring system 100. These monitors 245 may all be connected to the same computer and may even be part of the terminal where the mapping GUI 1100 is being utilized, alternatively the monitors may also represent remote monitors connected to remote monitoring computers that are connected to the monitoring system 100 via the network. In use, by way of non-limiting example, the user of the mapping GUI 1100 may drag, using a mouse, a video window 1120 showing a video stream from one of the cameras, to a monitor icon 1170 representing a remote monitor, thereby preferably giving the user of the remote monitor the ability to view the video stream. The user of the remote computer may view the stream by having a window with the video stream pop up on their monitor, or by receiving a prompt to open a video window with the stream, though any other method may be utilized. The user viewing the video stream may access a control 1180 that reorients the map 1110 to the location of the camera icon 1120 that represents the video camera producing the video stream.

The mapping GUI 1100 may further include a remote video navigation panel 80, which preferably provides the user of the mapping GUI 1100 with the ability to navigate various remote computer monitors throughout the system. The tools may any type of tool including scroll bars, shortcuts, links, etc.

The mapping GUI 1100 may further include an alert notification area 1130 where alerts and alarms may appear. In use, as described above, there may be situations where the various monitoring sensors may detect events that were predetermined to set off alarms or alerts. These alarms, which may be messages, sounds, flashing window objects, or any other type of indicator, may pop up on the mapping GUI 1100. The alerts and alarms may pop up on the GUI 1100 on the bottom right hand corner, or any other predetermined area, and notify the user of the event.

Figure 10:
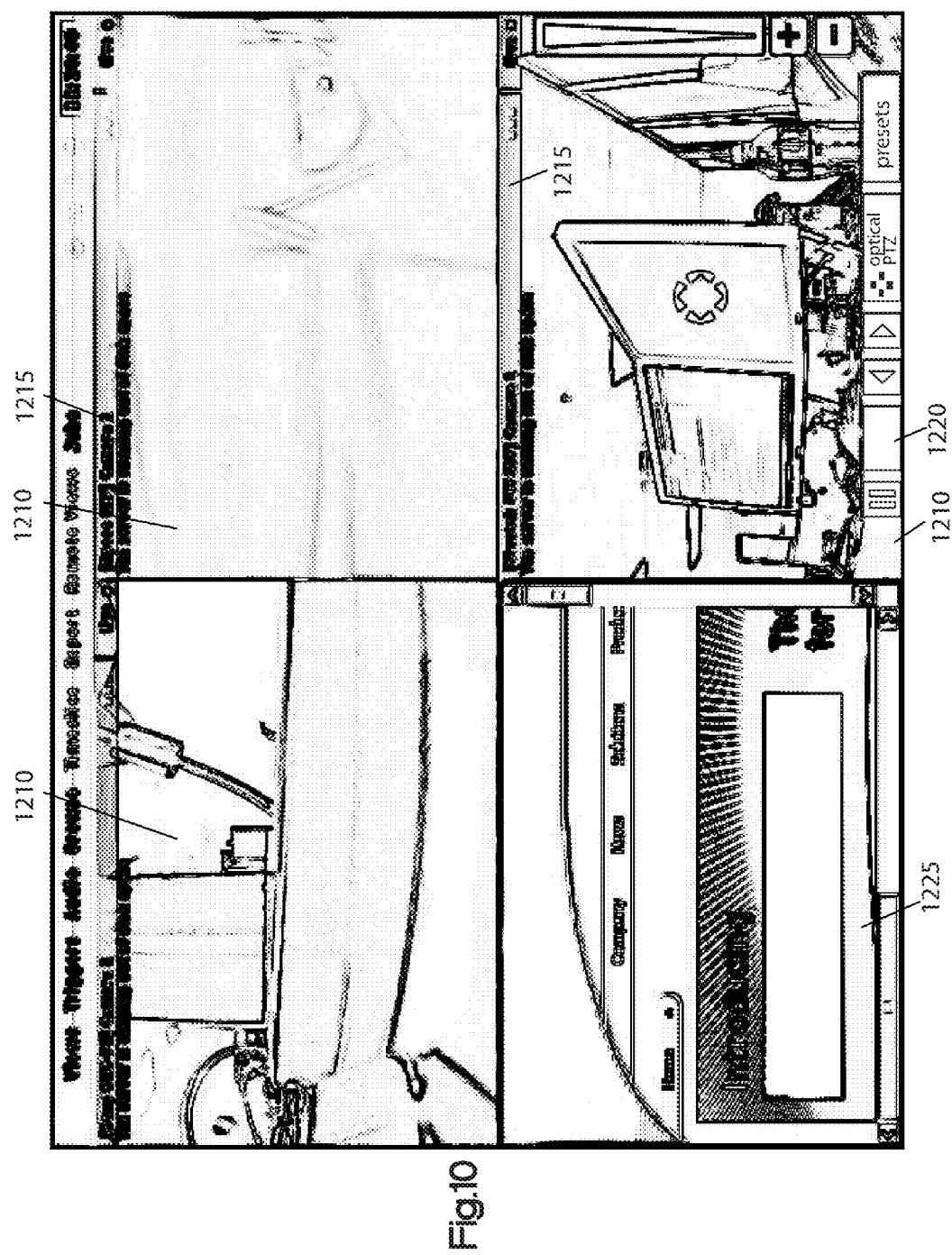
FIG. 10 is an overview of a video review graphical user interface in accordance with an embodiment of the present invention.

With reference to FIG. 10, there is shown and described an embodiment of a live video review GUI 1200 of a monitoring system 100. This is an exemplary GUI that users of the monitoring system 100 may use to monitor specific streams of live video from various monitoring sensors 210. The live review GUI 1200 may include one or more window objects 1210 displaying live video streams, alert notification area 1130, and a video navigation panel 20. This GUI allows users to simultaneously view selected live video streams from specific monitoring sensor 210 of their choosing. The live video review GUI 1200 may further include an embedded webpage 1225, which may be used to access various websites on the internet.

The video windows 1210 include a video information bar 1215, which may contain any relevant information about the video stream, such as, for example time, camera, or other indicative information. The video window objects 1210 may have the same functionality as the video window 1120 or any other functionality so long as video is viewable. In various embodiments it is envisioned that a video navigation panel 1220 may be used to control the video stream displayed in window 1210. The video navigation panel 1220 may be always visible, sometimes visible, or only visible upon user request. The video navigation panel 1220 may include any relevant tools, for example the ability to pause video, play video, pan, tilt, zoom, etc.

The live video review GUI 1200 may also include an event notification area 1230, similar to the alert notification area 1130, which may alert the user of various occurrences in the system.

It should be noted that the arrangement of the objects on the various user interfaces described above and below is only exemplary. Any layout may be utilized with different icons, various sized windows, etc. In various embodiments of the invention it is envisioned that users may customize the layout to fit their preferences by, for example dragging and resizing various objects of the GUI, or in any other manner.

Figure 11:
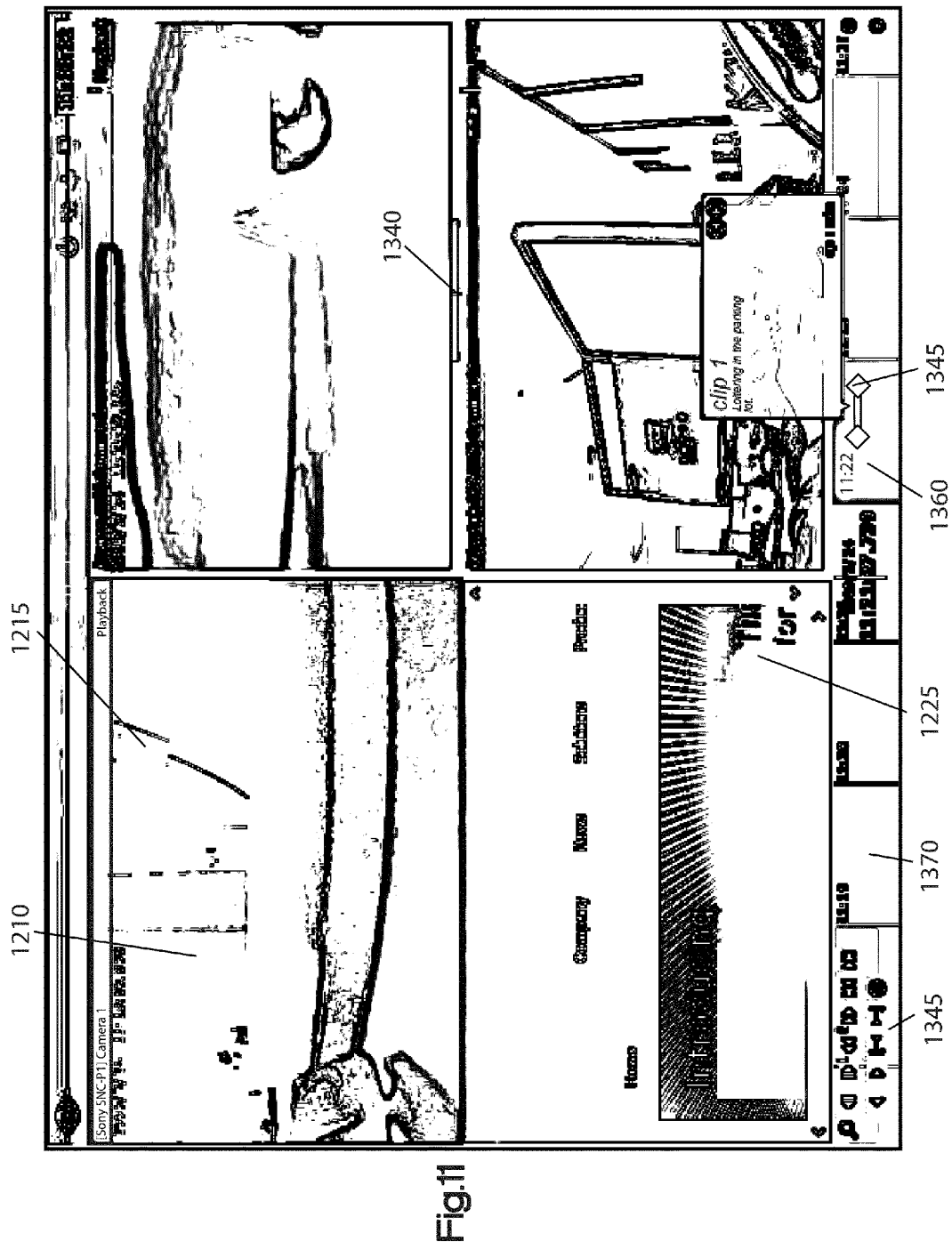
FIG. 11 is an overview of a video review graphical user interface in accordance with an embodiment of the present invention.

With reference to FIG. 11, there is shown and described an embodiment of a video review GUI 1300 of a monitoring system 100 which may be accessed by a user of the monitoring system 100 that wants to review the recorded live video stream. The video review GUI 1300 is similar to the live video review GUI 1200 except that it preferably includes an additional timeline control 1370, and individual time-line indicators 1340.

When reviewing recorded video, it is useful to know precisely when a particular event occurred, therefore in the present embodiment a timeline indicator 1340, which indicates which time segment is being displayed in the video window object 1210, is included.

The timeline control 1370 maybe used to review video streams. The timeline may resemble a ruler that can be dragged in order to navigate. The timeline 1370 may be bookmarked by the operator in order to define time segments of extra importance. The bookmarks 1355 and 1360 may be configured to contain additional information about the segment being bookmarked. Furthermore, the timeline control 1370, may include additional navigation tools 1345, which may include any tool such as fast forward, play, or other navigational features.

Figure 12:
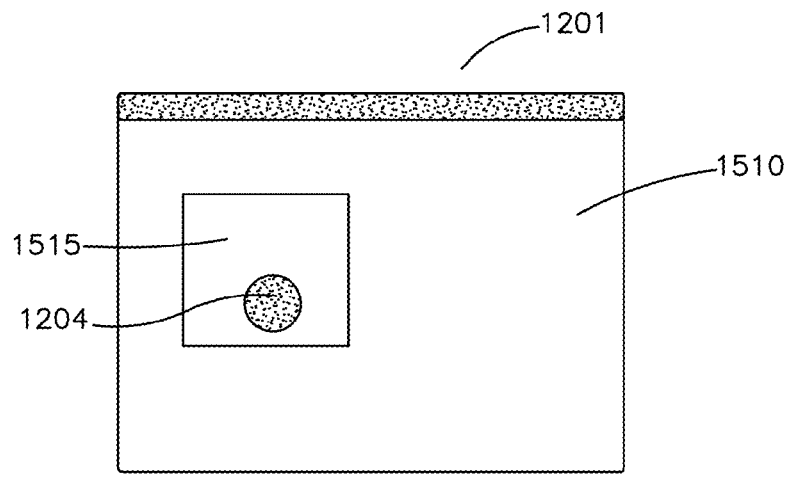
FIG. 12 is an overview of a motion detection based search analysis interface in accordance with an embodiment of the present invention.

With reference to FIG. 12, there is shown and described an embodiment of a motion detection based search analysis that can be performed on a stream of video information. Motion detection GUI 1201 may be accessed from the video review GUI 1300. In an embodiment of monitoring system 100, motion is detected by performing a frame comparison. By performing frame comparison, monitoring system 100 can detect changes that occur over time in the area being monitored by monitoring sensor 210 and send those streams of video information to be displayed in GUI 1300.

Frame comparison may be performed by drill down module 390 by first acquiring a reference frame (which may be selected by a user). This frame may be decoded from its compressed format (e.g. MJPEG or MPEG4) to an uncompressed 2-dimensional array of bytes. Each pixel of the frame consists of 3 bytes, 1 byte for the red component of the pixel, 1 byte for the green component of the pixel and 1 byte for the blue component of the pixel. The value of the byte ranges from 0 to 255, where 0 is "off" and 255 is "full intensity." By specifying different intensities for the 3 components more than 16 million different hues/shades can be made. The dimensions of the uncompressed frame matches the resolution of the reference frame to enable proper comparison. If the frame is 640 by 480 pixels, the array will contain 640 columns and 480 rows of 3 byte values, each value specifying the pixel color.

Thereafter another frame is acquired from a video source. The distance in time between the reference frame and the new frame may be specified by the user. In some cases, a fine combing of the video data is needed (e.g. to focus on where an object the subject was holding was placed), and thus the distance in time may be very small, less than one second, while other times the distance in time can be larger than 10 seconds (e.g. to monitor when a certain vehicle left the parking lot).

Like the reference frame, the new frame is decompressed into a 2-Dimensional array. Depending on the area being examined for motion, different values of arrays of reference frame and the new frame are extracted and compared to one another. The difference between each of the components of each frame is then examined (e.g. Dred=Abs (PixelR.Red−PixelN.Red), Dgreen=Abs (PixelR.Green−PixelN.Green), Dblue=Abs (PixelR.Blue−PixelN.Blue) where Dred represents the absolute value of difference in color between the red component of the pixel of the reference frame and the red component of the pixel of the new frame, Dgreen represents the absolute value of difference in color between the green component of the pixel of the reference frame and the green component of the pixel of the new frame, and Dblue represents the absolute value of difference in color between the blue component of the pixel of the reference frame and the blue component of the pixel of the new frame). If the difference in between one of the three components exceeds the sensitivity variable specified by the user then the system will consider the pixel to have changed value.

Once all the pixels have been compared between the two frames, the system determines whether sufficient number of pixels have changed to warrant a finding of a change between two frames. The number of pixels that need to have had changed may be set by a user of the monitoring system 100. Typically, the larger the number of pixels that need to have had changed, the more dramatic the change. A user looking for a large change would set the threshold higher than someone looking for a small change, thereby expediting the process by avoiding the need to look through extra video As shown and described in FIG. 12, in use, a user defines an area of interest 1515 in the stream of video information 1510. Thereafter, using controls described in detail below the user can cause the drill down module 390 of monitoring system 100 to perform frame comparison. As the drill down module 390 detects change between frames, the location of the change may be initially indicated by displaying a red pixel 1204 instead of the real pixel color. This change in pixel color alerts the user to focus on the area of interest where certain events have been detected. If the user pauses the search, the red pixel gradually fades and becomes transparent in order to reveal the original pixel color. In one embodiment, this creates a visible fading red trail showing a motion of an object.

It should be noted that the frame comparison process described above is purely exemplary and not limiting. It will be apparent to those skilled in the art that frame comparison may be performed in any of a multitude of ways for example by using sections of pixels, using algorithms instead of (or in addition to) user inputs, or through use of different video formats, or any other modification. It should be further noted that although frame comparison has been described with reference to motion detection, it may be used to detect other events such as the setting of the sun, changes in lighting, appearance of new objects, or any other event that can be seen by a difference between frames.

Figure 13:
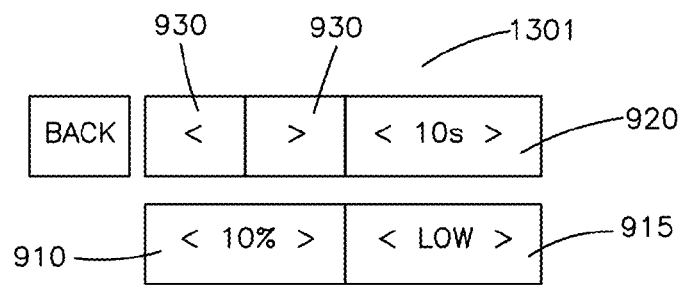
FIG. 13 is a screenshot diagram of exemplary controls for frame comparison in accordance with an embodiment of the present invention.
Figure 14:
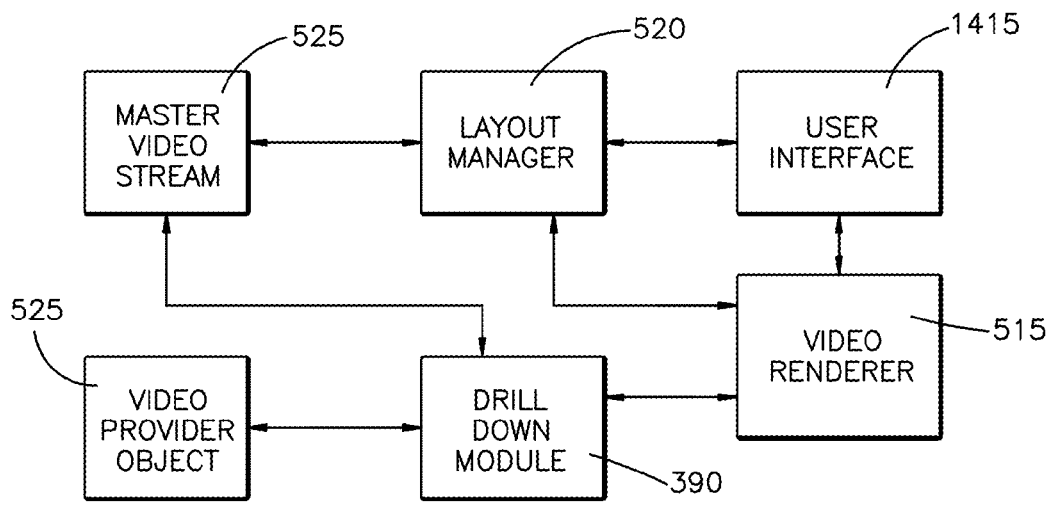
FIG. 14 is an overview of the flow of the drill down module in accordance with an embodiment of the present invention.

As shown and described with reference to FIG. 13, a user performing frame comparison may be provided with a graphical user interface including controls 1301 to select pixel count threshold 910, pixel change sensitivity 916, time step adjustment 920, and motion buttons 930 to navigate within the displayed video. These buttons are exemplary and other controls may be utilized to give user the ability to set the properties used in performing frame comparison.

In an embodiment, the monitoring system 100 can facilitate and expedite the process of locating a point in time when some particular event occurred. For that purpose, in response to user input to video review GUI 1300 (e.g. clicking on an icon on timeline control 1370, after selecting point in time of the recorded stream), monitoring system 100 may generate a thumbnail review GUI 1500 (as shown and described with reference to FIGS. 15A and 15B) which preferably contains a windows 1505 showing images that are temporally displaced within a recorded stream of video information which itself is displayed in a larger separate window 1510. The time-displaced windows 1505 can be "thumbnail" size. These windows 1505 may contain static images, although in alternate embodiments they maybe capable of video playback. Each of these individual frames 1505 may show an entire image that was recorded, or it may be a section of that recorded image.

To attain this functionality, the monitoring system 100 may include a plurality of system modules 110 loaded on the hardware (described above with reference to FIG. 2). As shown and described with reference to FIG. 14, system modules 110 of the monitoring system 100 preferably further include a drill down module 390 and a thumbnail review GUI control 1415 which work together with the display engine 515, provider URL module 525, layout module 520, and video stream from video source 213 to display the relevant video in a user-friendly manner for the user. The thumbnail review GUI control 1415 provides the functionality of thumbnail review GUI 1500, and the drill down module 390 provides the functionality of controls that can allow the operator to for example digitally pan to, tilt to, or zoom in on to focus the plurality of video frames on a specific region of interest within the entire region captured by a camera.

As shown and described with reference to FIGS. 15A and 15B, in use, after a request from a user, via thumbnail review GUI 500 module, drill down module 390 is passed a master video stream which may contain visual information from, for example a live feed from a camera on the premises, a live feed from a camera located off the premises, or a previously recorded video stream from any storage medium and location. Drill down module 390 may then create a provider URL 525 and cause the provider URL 525 to connect to the same video stream that was sent to the drill down module 390. The video stream may be identified by a unique resource identifier such as a URL. After URL 525, makes the connection to the video stream, layout manager 520 may display the master video stream in window 1510 that is rendered by display engine 515.

Drill down module 390 may also cause display engine 515 to create window objects 1505. For example display engine 515 may create twenty window objects 1505 with a 256 by 256 RBGA texture map attached. The drill down module 390 may keep track of the windows by keeping the references to the window objects 1505, in a data structure, such as an array. It will be apparent to one skilled in the art that any number of windows of any size, in any configuration, with any type of texture map, may be used.

The window objects may be populated with image frames from video stream by provider URL 525. Provider URL 525 preferably chooses frames, located at specific time intervals away from the time of the video stream that may be selected in any way, for example through the use of a timeline control 1170. The provider URL 525 preferably copies one image frame into each window object 1505. This process may be performed in a loop fashion, with the provider URL 525 choosing the first image frame, placing it into a window object, then choosing a second image frame that is a certain time interval removed from a timestamp of the first image frame, and placing the second image frame into a second window object, etc. until all of the window objects are populated with images. Alternatively, all the window objects 1505 may be populated at once, or in sections.

It should be noted that in various embodiments the drill down manager 390 may be utilized together with a multitude of modules in order to create window objects 1505 based upon any number of conditions. For example, in certain embodiments, the drill down manager 390 may be used in combination with frame comparison, thereby the various window objects 1505 may be generated based upon an occurrence of a change between the frames of the video stream. In further embodiments, drill down manager 390 may be combined with analytics performed by video source 213, monitoring sensor 210, or event coordinator module 320 and the various window objects 1505 may be created based upon occurrence of events or certain conditions being satisfied.

In order to fit the image frame into a window object 1505, the display engine 515 may convert and scale the image frame. The conversion and scaling preferably causes the image frame to match the type, size, and texture map of the window objects that is configured to be thumbnail size. For example, the image frame chosen from the video source may be converted to RGBA and scaled to a 256 by 256 matrix using nearest neighbor interpolation, though any other method, including but not limited to bilinear interpolation may be used. The scaled RGBA matrix may then be copied into the window object texture map. The coordinates of the window object maybe adjusted so that the aspect ratio of the window object is the same as the aspect ratio of the master video image frame. This way, the final image displayed in the window object will appear to be correctly scaled, even though the aspect ratio of the texture map is 1 to 1. It should be noted that scaling and conversion may be performed in any way so long as the scaled and converted image frame is capable of being displayed in the window object.

The monitoring system 100 preferably enables the user to focus, by digitally tilting and panning, on a specific area of the entire video source, and having the window objects 1505 digitally zoom in on that specific area. A thumbnail review GUI 1415 should permit a user to select a region of interest 1515 from the window 1510 displaying the video source. For example, this may be performed by a user drawing a rectangle around the region of interest 1515 in the thumbnail review GUI 1415. Many alternate methods of selecting a region of interest 1515 are possible, for example placing a pre-sized object over the area of interest, and the invention should not be limited to any specific method.

After the region of interest 1515 is selected, it is passed to the drill down module 390 which may then perform offset removal, normalization, aspect correction, and/or frame edge adjustment before having the display engine 515 place the region of interest 1515 as the frame image inside the window object 1510.

Figure 16:
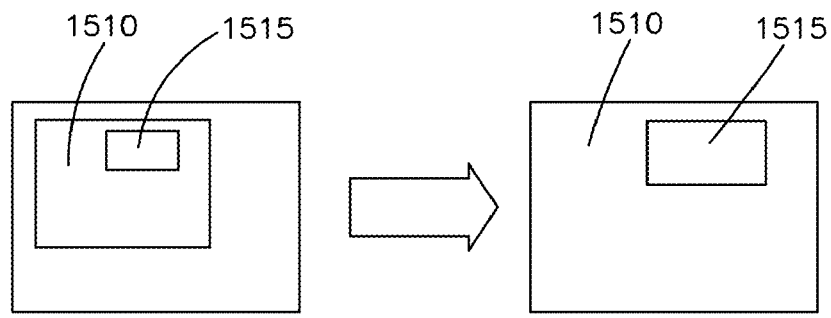
FIG. 16 is an illustration of offset removal in accordance with an embodiment of the present invention.

As shown in FIG. 16, depending on the programming language used and the display medium employed, offset removal may be performed prior to placing the frame image into the window object. Drill down module 390 may use the coordinates of the display medium, the coordinates of the stream of information, and the coordinates of the region of interest 1515 in order to derive the location of the region of interest 1515 within the stream of information.

Figure 17:
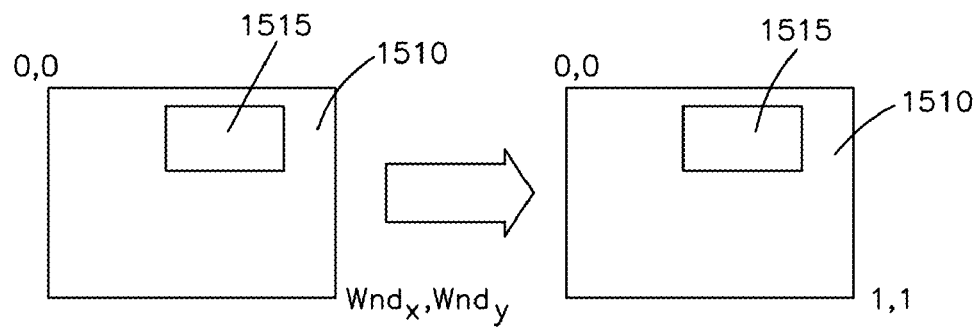
FIG. 17 is an illustration of normalization in accordance with an embodiment of the present invention.

As shown in FIG. 17, the region of interest 1515 is preferably normalized before being displayed on monitor 245. Normalization may be necessary because in current systems the position of windows on the monitor is generally specified in either pixel coordinates or in 3-Dimensional space coordinates. The texture map, which, in current systems, constitutes the actual content of a window on the monitor may have dimensions that are different from the window itself. In order to specify what portion of the texture map is displayed inside the window, normalized coordinates may be used. By way of non-limiting example, the coordinate (0,0) may be used to represent the upper left corner of the texture map, while (1,1) may represent the lower right corner. Thus, to show the entire contents of the texture map in the window, the coordinates (0,0), (1,1) are used, and may be manipulated in order to allow a user to zoom in on an area. By way of non-limiting example (0,0), (0.5, 0.5) may be used to show the upper left of the texture inside the window. Since the position of the window displaying the texture map of an image on the monitor hasn't changed, it will appear to the user as if the window zoomed in on a portion of the image. It is possible that in alternate embodiments normalization may be accomplished in an alternative ways. If computers and displays utilize operating systems that map texture maps in ways other than pixel or 3-Dimensional space coordinates, normalization may not be necessary, or may need to be implemented in ways that are compatible with those systems.

Figure 18:
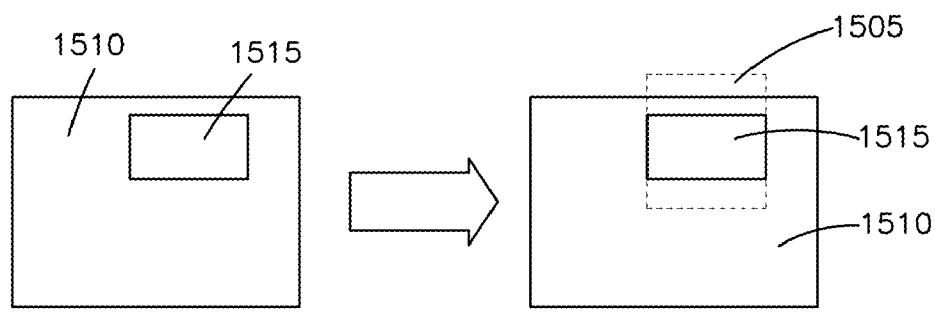
FIG. 18 is an illustration of aspect ratio adjustment in accordance with an embodiment of the present invention.

As shown in FIG. 18, there may be instances where the aspect ratio of the window object does not match the aspect ratio of the region of interest 1515. This may occur in instances where the window object is set to a certain aspect ratio 1505, while the aspect ratio of the region of interest 1515 is determined by the user. In such monitoring system 100 configurations, the drill down module 390 may adjust the size of the region of interest 1515 to make its aspect ratio match the aspect ratio of the window object 1505. In order to achieve this without stretching or shrinking the subjects within the region of interest 1515, additional area of the master video stream may be automatically added, by the drill down module 390, to the region of interest 1515.

Figure 19:
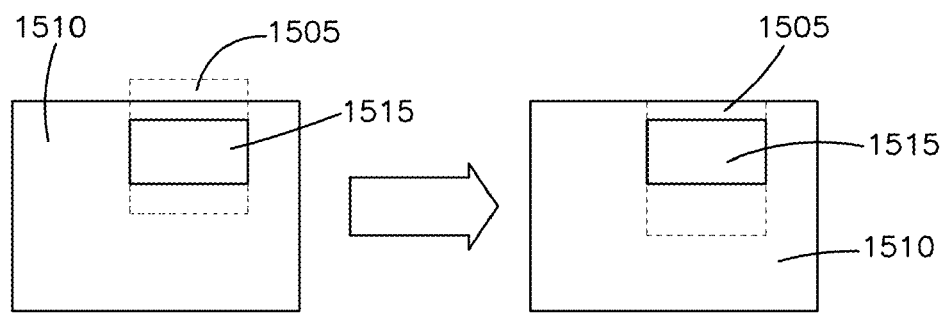
FIG. 19 is an illustration of edge adjustment in accordance with an embodiment of the present invention.

As shown in FIG. 19, aspect ratio adjustment may cause the post ratio adjustment region of interest 1515 to lie outside of the master video stream. To prevent this, the drill down module 390 may automatically adjust the edges of the region of interest 1515 such that they lie within the borders of the master video stream. This is done by either subtraction or addition of values to the coordinates of the region of interest 1515.

In one embodiment a user of monitoring system 100 can analyze certain portions of a video stream without viewing or scrolling through the entire video stream. Alternatively, a user of monitoring system 100 can view portions of multiple video streams that all correspond to the same exact time period.

The window objects, generated by the monitoring system 100, may be capable of displaying video. The operator may provide any type of applicable input to the monitoring system 100, for example pressing a key on a keyboard, touching a touchpad, or clicking a specific button or menu on the monitor, instructing the monitoring system 100 to play the video, in each of the window objects, from the point in time displayed of the image displayed in each window object. It should be appreciated that the monitoring system 100 may be configured to have all of the thumbnails play video at once, alternatively some thumbnails may play video while others remain paused. Additionally, each window object may have controls for performing operations such as fast forward, rewind, pause, on the video in each individual window object. Enhancements, such as motion tracking described above with reference to FIG. 12 may be shown within the thumbnails. In embodiments where the individual windows 1505 contain static images, clicking on such windows 1505 preferably results in the video playing back in source window 1510 or another location, starting from the point in time of the static image in a window 1505.

The GUI of the monitoring system 100 is purely exemplary, and the location and size and shape of the window objects, buttons, etc. may take on any configuration. Additionally, in various embodiments of the monitoring system 100, the user may have the ability to alter the positions and sizes of the various window objects on the monitor.

It should be noted that while the various GUIs are shown herein as being displayed on a single monitor, it should be appreciated that any number of monitors may be utilized. By way of non-limiting example, mapping GUI 1100 may be displayed on a video wall of multiple monitors with one monitor showing the map 1110, and the other monitors showing various live video window objects 1120. These window objects can, for example, be particular portions of a longer video being displayed on GUI 1100, or may be unrelated video monitors.

It should be noted that although the embodiments described herein refer to multiple software modules for performing the various functions of monitoring system 100, other embodiments could be implemented with a single module incorporating the functions of several, or all, of the modules. The precise design of the software and the programming language used may be designed differently within the scope of the present invention. The software modules can be created using art recognized programming languages, including but not limited to C, C++, Java, C#, or PHP or any combination of known or hereafter developed programming languages that allow the functionality described.

Those skilled in the art will recognize that the method and system of the present invention has many applications, may be implemented in many manners and, as such is not to be limited by the foregoing embodiments and examples. In other words, functional elements being performed by a single or multiple components, in various combinations of hardware and software, and individual functions can be distributed among software applications. In this regard, any number of the features of the different embodiments described herein may be combined into one single embodiment and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present invention covers conventionally known and features of those variations and modifications through the system component described herein as would be understood by those skilled in the art. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

We claim:

1. A computer implemented method of detecting activity within a video on a computer system, wherein the computer system includes a video and a display with a graphical user interface, the surveillance method comprising:
    acquiring a reference frame from the video;
    acquiring a comparison frame;
    comparing the pixels of the reference frame to the pixels of the comparison fame to detect pixels that have changed;
    showing at least a portion of the video on the graphical user interface;
    showing the change in pixels on the graphical user interface by coloring the changed pixels with a pre-defined color; and
    gradually altering the pre-defined color to reveal the color of the changed pixels prior to the coloring.

2. The method of claim 1, further including the step of determining the brightness of the pre-defined color based upon the number of pixels that have changed.

3. The method of claim 1, wherein the correlation between the brightness of the color and the number of pixels that have changed is determined based upon an input by a human operator.

4. The method of claim 1, including the step of showing the color of the changed pixels prior to the coloring in response to an input by a human operator.

5. The method of claim 1, wherein the reference frame is selected by a human operator.

* * * * *